US009955515B2

United States Patent

(12) United States Patent
Kawakami et al.

(10) Patent No.: US 9,955,515 B2
(45) Date of Patent: Apr. 24, 2018

(54) WIRELESS COMMUNICATION APPARATUS

(71) Applicant: SONY CORPORATION, Tokyo (JP)

(72) Inventors: Daisuke Kawakami, Kanagawa (JP); Shinji Takae, Tokyo (JP); Hideyuki Suzuki, Tokyo (JP); Katsutoshi Itoh, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/302,773

(22) PCT Filed: Mar. 11, 2015

(86) PCT No.: PCT/JP2015/057189
§ 371 (c)(1),
(2) Date: Oct. 7, 2016

(87) PCT Pub. No.: WO2015/166722
PCT Pub. Date: Nov. 5, 2015

(65) Prior Publication Data

US 2017/0034864 A1 Feb. 2, 2017

(30) Foreign Application Priority Data

May 1, 2014 (JP) ................................ 2014-094654

(51) Int. Cl.
*H04B 7/00* (2006.01)
*H04W 76/02* (2009.01)
(Continued)

(52) U.S. Cl.
CPC ......... *H04W 76/023* (2013.01); *H04W 12/06* (2013.01); *H04W 84/10* (2013.01);
(Continued)

(58) Field of Classification Search
CPC ... H04W 76/023; H04W 12/06; H04W 84/10; H04W 84/12; H04W 88/04; H04W 4/008
See application file for complete search history.

(56) References Cited

U.S. PATENT DOCUMENTS

2005/0272466 A1* 12/2005 Haverinen .......... H04L 12/2801 455/552.1
2006/0052085 A1 3/2006 Gregrio Rodriguez et al.
(Continued)

FOREIGN PATENT DOCUMENTS

JP 2005-524341 A 8/2005
JP 2012-039282 A 2/2012
(Continued)

OTHER PUBLICATIONS

International Search Report dated Apr. 14, 2015 in PCT/JP2015/0057189 filed Mar. 11, 2015.

*Primary Examiner* — Tuan Pham
(74) *Attorney, Agent, or Firm* — Oblon, McClelland, Maier & Neustadt, L.L.P.

(57) ABSTRACT

[Object] To propose a wireless communication apparatus that is capable of connecting to the Internet more easily. [Solution] Provided is a wireless communication apparatus including: a first wireless communication unit configured to wirelessly communicate with a wireless terminal having subscriber identification information for a first network; a second wireless communication unit configured to connect to a second network to perform wireless communication; and a control unit configured to receive authentication information based on the subscriber identification information from the wireless terminal by the first wireless communication unit, and perform authentication to the second network using the authentication information by the second wireless communication unit.

15 Claims, 14 Drawing Sheets

(51) Int. Cl.

| | |
|---|---|
| ***H04W 12/06*** | (2009.01) |
| ***H04W 84/10*** | (2009.01) |
| ***H04W 84/12*** | (2009.01) |
| ***H04W 88/04*** | (2009.01) |
| *H04W 4/00* | (2018.01) |

(52) U.S. Cl.

CPC ........... *H04W 84/12* (2013.01); *H04W 88/04* (2013.01); *H04W 4/008* (2013.01)

(56) References Cited

U.S. PATENT DOCUMENTS

| | | | | |
|---|---|---|---|---|
| 2010/0118847 | A1 | 5/2010 | Lee et al. | |
| 2012/0058721 | A1 | 3/2012 | Fok et al. | |
| 2013/0318249 | A1* | 11/2013 | McDonough | H04L 67/02 709/228 |
| 2015/0011188 | A1* | 1/2015 | Chou | H04W 4/16 455/411 |

FOREIGN PATENT DOCUMENTS

| | | | |
|---|---|---|---|
| JP | 2012-517040 | A | 7/2012 |
| JP | 2013-219740 | A | 10/2013 |
| JP | 2013-251873 | A | 12/2013 |
| WO | 2008/084621 | A1 | 7/2008 |

* cited by examiner 1
500
510
BASE STATION
100
WLAN TERMINAL
300
340
AUTHENTICATION SERVER
400
SERVICE NETWORK
320
GATEWAY
330
SUBSCRIBER INFORMATION SERVER
350
NETWORK INFORMATION PROVIDING SERVER
310
BASE STATION
200
WWAN TERMINAL 310
BASE STATION
200
WWAN TERMINAL
WWAN
212
BT
216
NFC
218
100
WLAN TERMINAL
Wi-Fi
112
BT
114
NFC
116
510
BASE STATION
S402
Wi-Fi Operation
S404
TETHERING CONNECTION REQUEST
S406
TETHERING START PROCESS
S408
TETHERING CONNECTION RESPONSE
S410
TETHERING OPERATION START 940
941
942
VEHICLE MODULE
920
926
DATA I/F
922
MEMORY
931
SPEAKER
938
BATTERY
925
SENSOR
921
PROCESSOR
927
CONTENT PLAYER
928
STORAGE MEDIUM I/F
924
GPS MODULE
933
WIRELESS COMMUNICATION I/F
929
INPUT DEVICE
930
DISPLAY DEVICE
934
935

WIRELESS COMMUNICATION APPARATUS

TECHNICAL FIELD

The present disclosure relates to a wireless communication apparatus.

BACKGROUND ART

Recent years have seen various services using the Internet, and means for easily accessing the Internet even away from home have been demanded. For example, terminals with a wireless wide area network (WWAN) communication function, such as smartphones and mobile phones, can access the Internet via a mobile communication network even away from home. On the other hand, terminals without a WWAN communication function are required to access the Internet using other communication schemes, such as wireless local area network (WLAN). Connecting to a network (e.g., WLAN) may require processes such as searching for an access point and inputting an identifier (ID) and a password, which leads to demands for technologies for facilitating such processes.

For example, Patent Literature 1 below discloses a technology of receiving a communication parameter for connection to a network from another wireless terminal connected to the network, and connecting to the network using the received communication parameter.

CITATION LIST

Patent Literature

Patent Literature 1: JP 2013-251873A

SUMMARY OF INVENTION

Technical Problem

The technology described in Patent Literature 1, however, requires performing an authentication process for oneself using the communication parameter received from the other wireless terminal. Hence, the present disclosure proposes a novel and improved wireless communication apparatus that is capable of connecting to the Internet more easily.

Solution to Problem

According to the present disclosure, there is provided a wireless communication apparatus including: a first wireless communication unit configured to wirelessly communicate with a wireless terminal having subscriber identification information for a first network; a second wireless communication unit configured to connect to a second network to perform wireless communication; and a control unit configured to receive authentication information based on the subscriber identification information from the wireless terminal by the first wireless communication unit, and perform authentication to the second network using the authentication information by the second wireless communication unit.

According to the present disclosure, there is provided a wireless communication apparatus including: a storage unit configured to store subscriber identification information for a first network; a wireless communication unit configured to wirelessly communicate with a wireless terminal that connects to a second network to perform wireless communication; and a control unit configured to generate authentication information based on the subscriber identification information stored in the storage unit, and transmit the authentication information to the wireless terminal by the wireless communication unit.

Advantageous Effects of Invention

According to the present disclosure, it is possible to connect to the Internet more easily.

Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
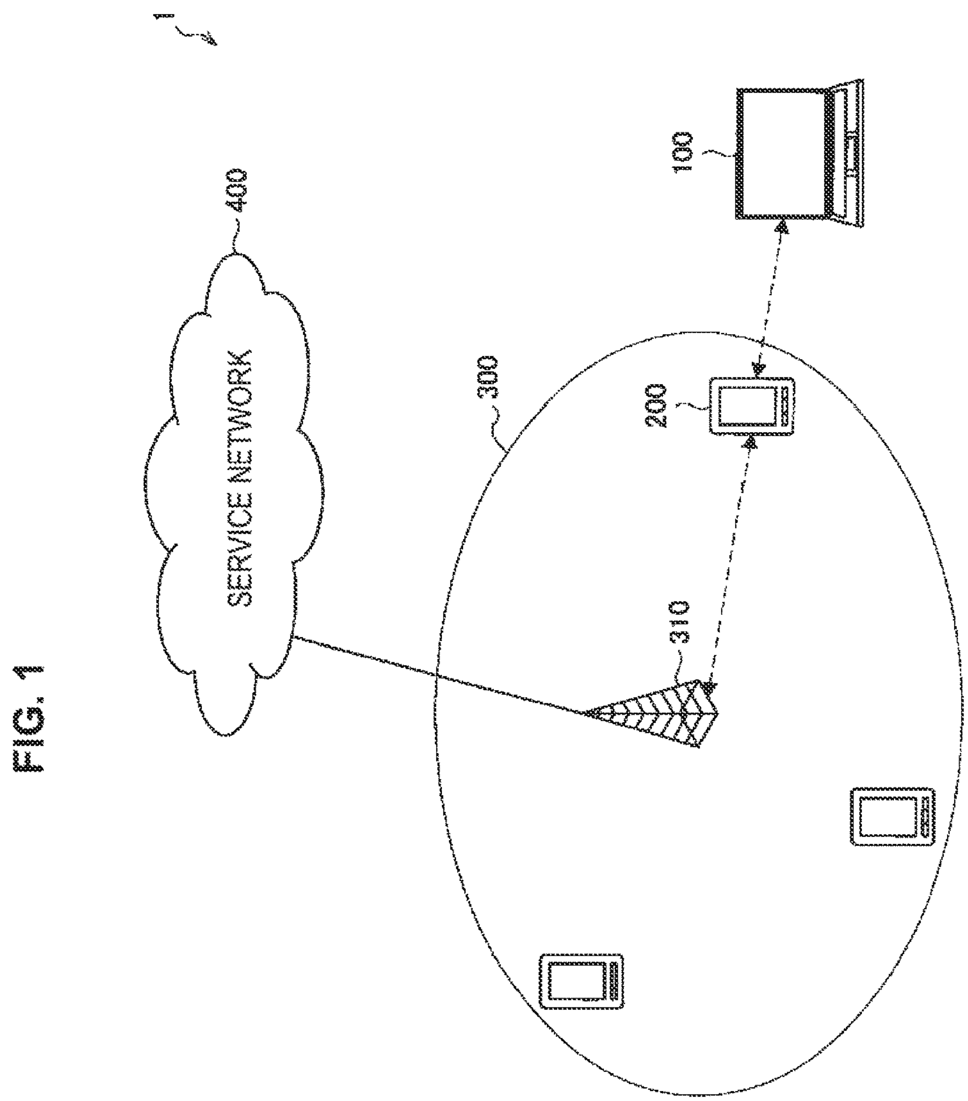
FIG. 1 is a view for explaining an overview of a wireless communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.

1. Overview
2. Configuration Example
   2-1. Configuration example of wireless communication system
   2-2. Configuration example of WLAN terminal
   2-3. Configuration example of WWAN terminal
3. Operation Process
   3-1. Connection process sequence 1
   3-2. Connection process sequence 2
   3-3. Connection process sequence 3
   3-4. Tethering process sequence
   3-5 Network switching process flow
4. Application Examples
5. Conclusion

1. OVERVIEW

First, an overview of a wireless communication system 1 according to an embodiment of the present disclosure will be described with reference to FIGS. 1 and 2.

Figure 2:
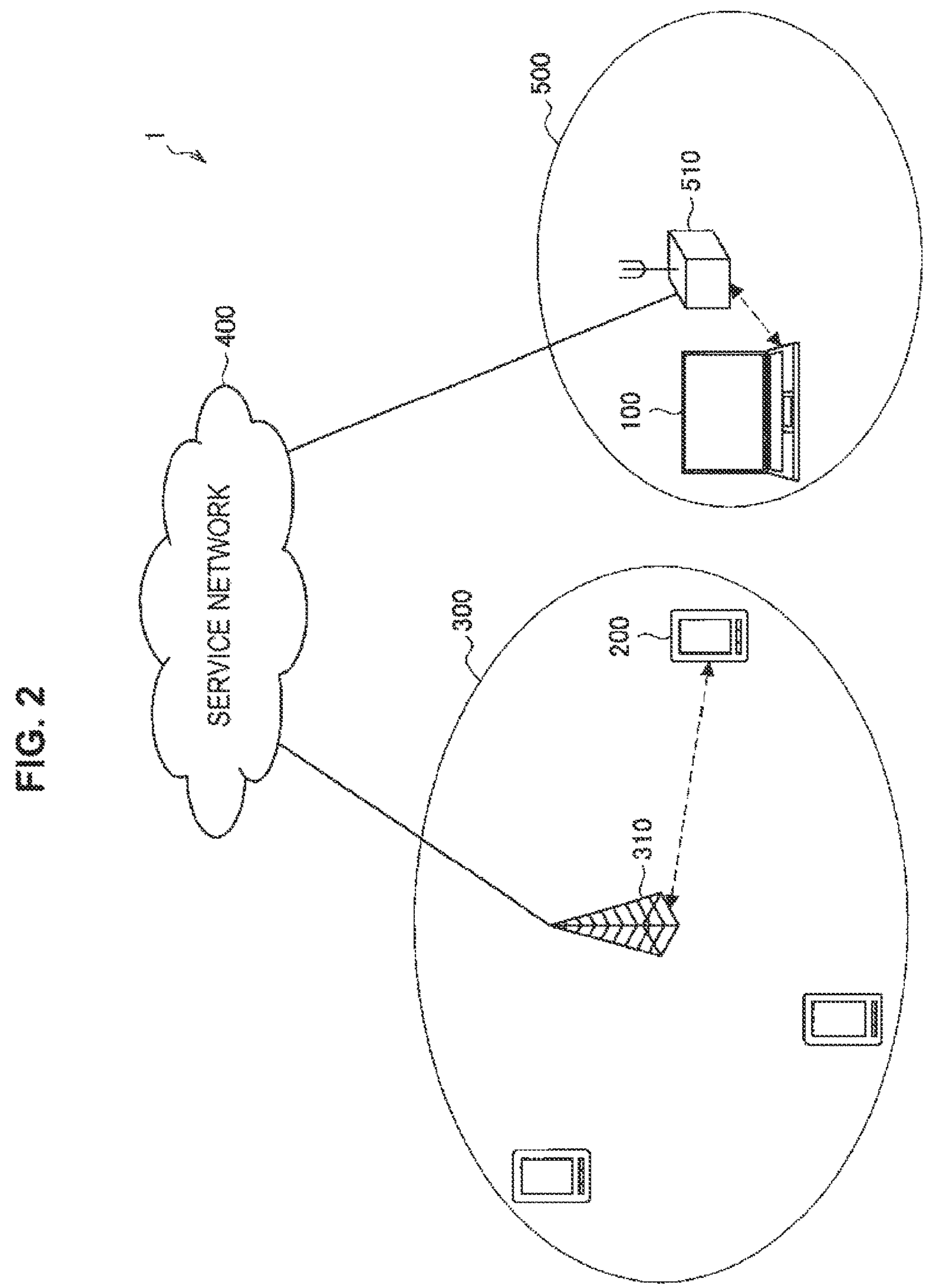
FIG. 2 is a view for explaining an overview of a wireless communication system according to an embodiment of the present disclosure.

FIGS. 1 and 2 are views for explaining the overview of the wireless communication system 1 according to an embodiment of the present disclosure. As illustrated in FIGS. 1 and 2, the wireless communication system 1 includes a wireless communication apparatus 100 and a wireless communicators apparatus 200.

The wireless communication apparatus 100 is a wireless terminal capable of wirelessly communicating with another apparatus. In the example of FIG. 1, the wireless communication apparatus 100 is a notebook PC. The wireless communication apparatus 100 is a WLAN terminal that can connect to a WLAN according to a communication scheme, such as Institute of Electrical and Electronics Engineers (IEEE) 802.11a, 11b, 11g, 11n, 11ac, or 11ad. In addition, as illustrated in FIG. 1, the WLAN terminal 100 can establish wireless connection with the wireless communication apparatus 200. This wireless connection can be established according to any communication scheme, such as Bluetooth (registered trademark) or near field communication (NFC). The WLAN terminal 100 can connect to a WLAN whose network information is known, such as a WLAN operated at a user's home, for example, but cannot easily connect to a WLAN whose network information is unknown, such as a WLAN away from home. Note that the wireless communication apparatus 100 may be implemented as, as well as a notebook PC, a PC, a tablet terminal, personal digital assistants (PDA), a head mounted display (HMD), a headset, a digital camera, a digital video camera, a smartphone, a mobile phone terminal, a portable music player, a portable video processor, or a portable game device.

The wireless communication apparatus 200 is a wireless terminal capable of wirelessly communicating with another apparatus. In the example of FIG. 1, the wireless communication apparatus 200 is a smartphone. The wireless communication apparatus 200 can establish wireless connection with the WLAN terminal 100, for example. In addition, the wireless communication apparatus 200 is a WWAN terminal that has a WWAN communication function and can connect to a WWAN. The WWAN terminal 200 has subscriber identification information for connection to a mobile communication network, and performs an authentication process using the subscriber identification information to establish wireless connection with a wireless network 300 (e.g., mobile communication network). The subscriber identification information is, for example, international mobile subscriber identity (IMSI) stored in a subscriber identity module card (SIM card). The WWAN terminal 200 can connect to the wireless network 300 using the WWAN communication junction, and use a service provided by a service network 400. Note that the wireless communication apparatus 200 may be implemented as, as well as a smartphone, a notebook PC, a PC, a tablet terminal, PDA, a HMD, a headset, a digital camera, a digital video camera, a mobile phone terminal, a portable music player, a portable video processor, or a portable game device.

The wireless network 300 is a WWAN (first network), such as a mobile communication network. For example, the WWAN 300 is operated according to any wireless communication scheme, such as Long Term Evolution (LTE), LTE-Advanced (LTE-A), GSM (registered trademark), UMTS, W-CDMA, or CDMA200. For example, the wireless communication apparatus 200 located within a range of a cell operated by a base station 310 connects to the WWAN 300.

The service network 400 is a public network, such as the Internet. The WWAN terminal 200 can access the service network 400 via the WWAN 300.

Here, a terminal without a WWAN communication function cannot easily access the Internet via the WWAN 300. Even in such as case, as a means of accessing the Internet away from home, for example, tethering by a terminal capable of WWAN communication may be performed, or a public WLAN may be used, for example.

Tethering is a technology in which, via a terminal with a WWAN communication function, such as a smartphone, another communication terminal connects to a WWAN. As illustrated in FIG. 1, the WWAN terminal 200 is collectable to the WWAN 300 and the WLAN terminal 100. Thus, the WWAN terminal 200 can serve as an access point that relays communication between the WWAN 300 and the WLAN terminal 100, thus enabling tethering. This allows the WLAN terminal 100 to use a service provided by the service network 400.

Tethering is available regardless of where the WWAN terminal 200 is located in a WWAN communication available area. However, terminal setting for using tethering is required to be performed in both the WWAN terminal 200 and the WLAN terminal 100, which leads to poor user convenience. Moreover, during tethering, the WWAN terminal 200 serving as an access point consumes a large amount of power.

Meanwhile, a public WLAN is a service that provides connection to the Internet using a WLAN. Hereinafter, communication using the public WLAN will be described with reference to FIG. 2. A wireless network 500 illustrated in FIG. 2 is a public network (second network) operated by a WLAN, for example. The WLAN terminal 100 can connect to the WLAN 500 to access the service network 400, or to access the service network 400 further via the WWAN 300. This allows the WLAN terminal 100 to use a service provided by the service network 400.

Here, a wireless terminal with a WWAN communication function, such as a smartphone, can connect to a surrounding public WLAN and perform user authentication using its own subscriber identification information, by using a technology of access network discovery and selection function (ANDSF) proposed by Third Generation Partnership Project (3GPP) or Wi-Fi CERTIFIED Passpoint proposed by Wi-Fi Alliance. However, a wireless terminal without a WWAN communication function, like a notebook PC, not having subscriber identification information, may require a user to select an available public wireless LAN for oneself and perform an authentication procedure, which leads to poor convenience.

Hence, with the above circumstance as a viewpoint, a wireless communication apparatus according to an embodiment of the present disclosure has been devised. The wireless communication apparatus according to an embodiment of the present disclosure is able to use the Internet easily even without a WWAN communication function and subscriber identification information. Hereinafter, detailed description will be given on a wireless communication system including the wireless communication apparatus according to an embodiment of the present disclosure, with reference to FIGS. 3 to 10.

2. CONFIGURATION EXAMPLE

[2-1. Configuration Example of Wireless Communication System]

Figure 3:
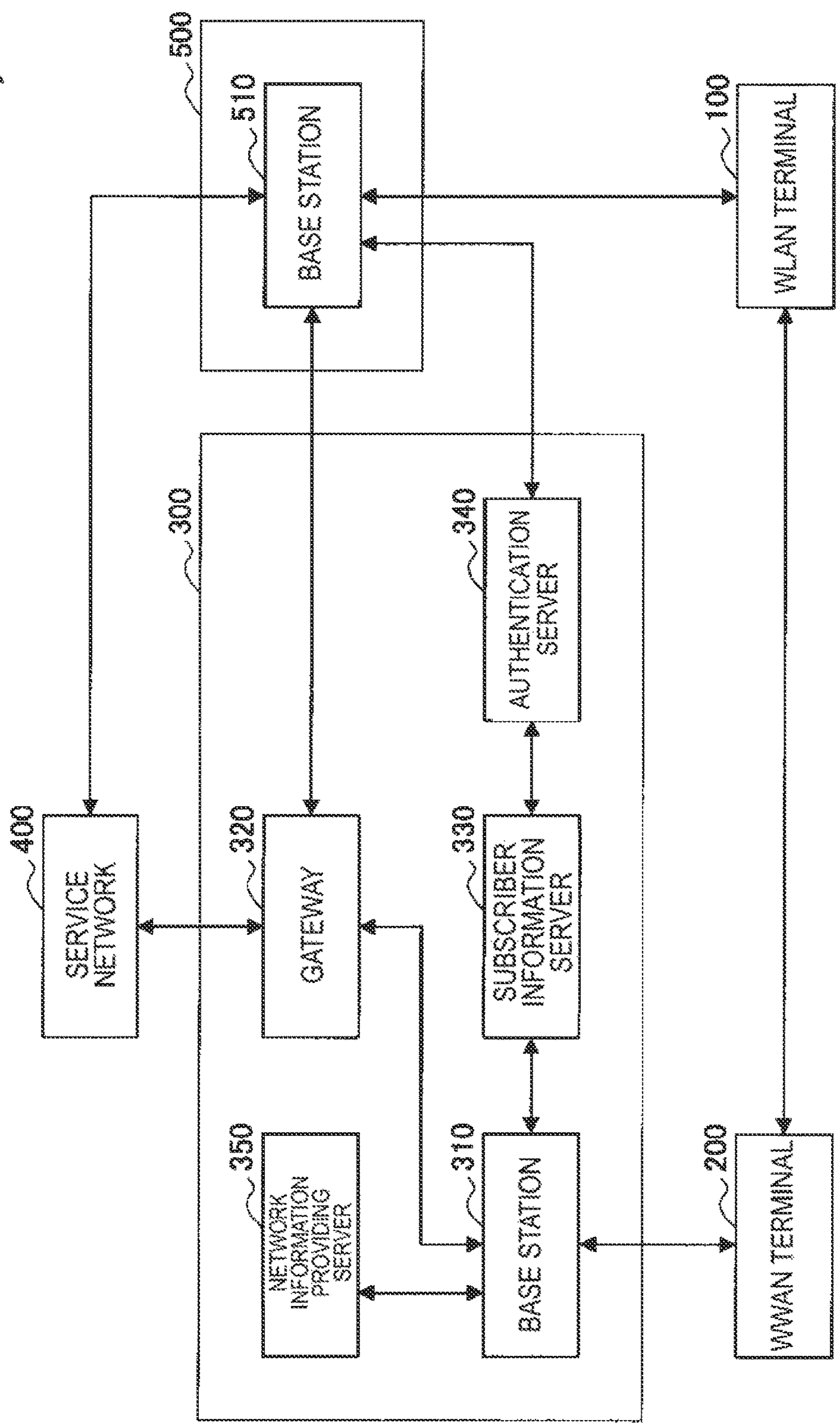
FIG. 3 is a block diagram illustrating an example of a logical configuration of a wireless communication system according to the present embodiment.

FIG. 3 is a block diagram illustrating an example of a logical configuration of the wireless communication system 1 according to the present embodiment. As illustrated in FIG. 3, the wireless communication system 1 includes the WLAN terminal 100 and the WWAN terminal 200, and provides wireless connection to the WWAN 300, the WLAN 500, and the service network 400.

(1) WWAN 300

As illustrated in FIG. 3, the WWAN 300 is operated by the base station 310, a gateway 320, a subscribes information server 330, an authentication server 340, and a network information providing server 350.

(1-1) Base Station 310

The base station 310 serves as a contact when a wireless terminal with a WWAN communication function connects to the WWAN 300. For example, the base station 310 accepts connection from the WWAN terminal 200. In LTE, the base station 310 corresponds to an eNB.

(1-2) Gateway 320

The gateway 320 relays communication between the WWAN 300 and another network. For example, the gateway 320 relays communication between the WWAN 300 and the service network 400, and communication between the WWAN 300 and the WLAN 500. In LTE, the gateway 320 corresponds to a packet data network gateway (P-GW).

(1-3) Subscriber Information Server 330

The subscriber information server 330 retains subscriber information for the WWAN 300. The subscriber information server 330 also retains information used for an authentication process when a wireless terminal connects to the WWAN 300. In LTE, the subscriber information server 330 corresponds to a home subscriber server (HSS).

(1-4) Authentication Server 340

The authentication server 340 authenticates that connection to the WWAN 300 is connection by a subscriber of the WWAN 300. The authentication server 340 may perform this authentication process referring to the subscriber information server 330. In LTE, the authentication server 340 corresponds to an authentication, authorization and accounting (AAA) server.

The WWAN 300 and the WLAN 500 share subscriber identification information used for authentication. In other words, a terminal that has a WWAN communication function and can connect to the WWAN 300 through an authentication process using the subscriber identification information can also connect to the WLAN 500 through an authentication process using the subscriber identification information. The authentication server 340 performs an authentication process referring to the subscriber information server 330 on both a terminal that performs connection to the WLAN 500 and a terminal that performs connection to the WWAN 300.

(1-5) Network Information Providing Server 350

The network information providing server 350 provides information on a wireless network that is a connection destination, which is needed in switching a connection destination from a wireless network to which a wireless terminal is connected currently to another wireless network. For example, the network information providing server 350 may provide the WWAN terminal 200 with network information for connecting to the WLAN 500. In LTE, the network information providing server 350 corresponds to an ANDSF server.

(2) WLAN 500

As illustrated in FIG. 3, the WLAN 500 is a public network operated by a base station 510. In this specification, a communication scheme of the public network is described to be WLAN, but the public network may be operated according to any other communication scheme, such as Bluetooth.

The base station 510 serves as a contact when a wireless terminal with a WLAN communication function connects to the WLAN 500. For example, the base station 510 accepts connection from the WLAN terminal 100. In the case where a communication scheme of the public network is WLAN, the base station 510 corresponds to an access point.

[2-2. Configuration Example of WLAN Terminal]

Figure 4:
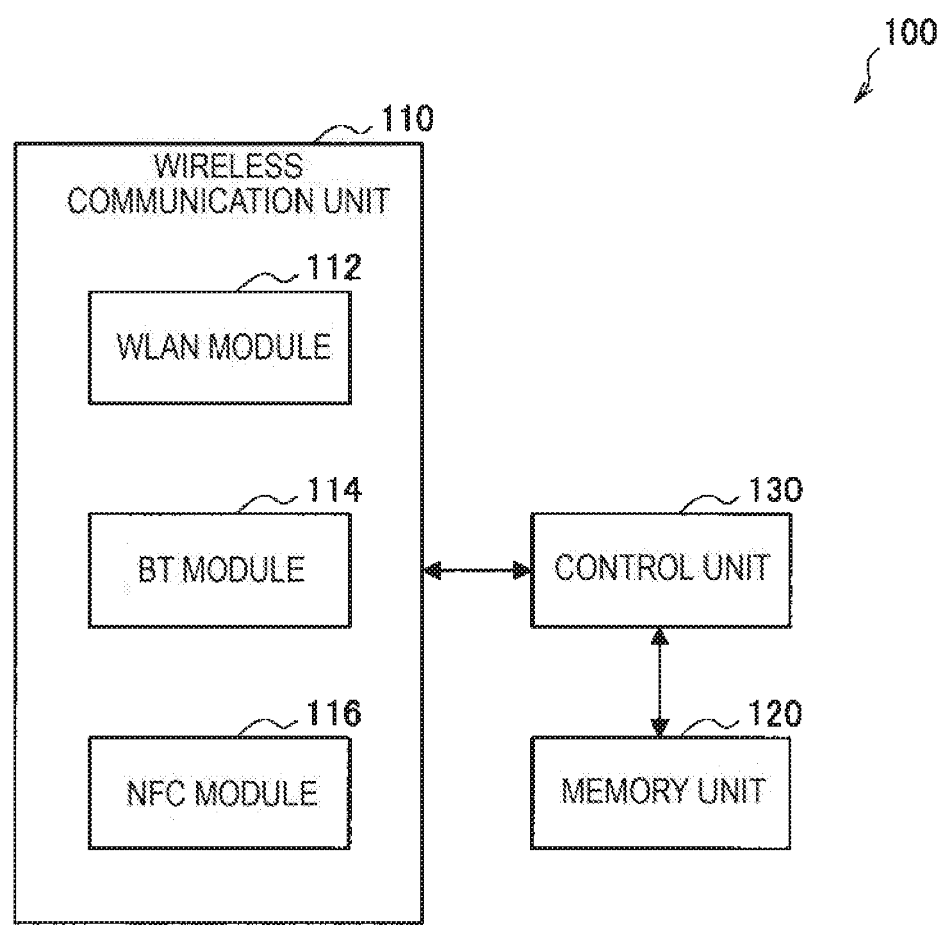
FIG. 4 is a block diagram illustrating an example of a logical configuration of a WLAN terminal according to the present embodiment.

FIG. 4 is a block diagram illustrating an example of a logical configuration of the WLAN terminal 100 according to the present embodiment. As illustrated in FIG. 4, the WLAN terminal 100 includes a wireless communication unit 110, a memory unit 120, and a control unit 130.

(1) Wireless Communication Unit 110

The wireless communication unit 110 is a communication module that transmits and receives data to/from an external device. The wireless communication unit 110 can perform wireless communication using various communication schemes. For example, the wireless communication unit 110 includes a WLAN module 112 and is capable of wireless communication using Wi-Fi (registered trademark), or WLAN. The wireless communication unit 110 also includes a Bluetooth (BT) module 114 and is capable of wireless communication using Bluetooth. The wireless communication unit 110 also includes an NFC module 116 and is capable of wireless communication using NFC.

For example, the wireless communication unit 110 may serve as a first wireless communication unit that wirelessly communicates with the WWAN terminal 200. For example, the wireless communication unit 110 wirelessly communicates with the WWAN terminal 200 using a near field communication scheme, such as NFC or Bluetooth.

For example, the wireless communication unit 110 may serve as a second wireless communication unit that connects to a public network to perform wireless communication. For example, the wireless communication unit 110 connects to the WLAN 500 using a wireless communication scheme, such as WLAN. The public network may support any wireless communication scheme other than WLAN, and in that case, the wireless communication unit 110 may connect to the public network using a wireless communication scheme corresponding to the public network.

(2) Memory Unit 120

The memory unit 120 performs recording and reproduction of data on a predetermined recording medium. For example, the memory unit 120 stores information received from the WWAN terminal 200 by the wireless communication unit 110. For example, the memory unit 120 may store network information described later.

(3) Control Unit 130

The control unit 130 serves as an arithmetic processor and a controller, and controls the overall operation in the apparatus WLAN terminal 100 according to various programs.

For example, the control unit 130 receives authentication information based on subscriber identification information from the WWAN terminal 200 by the wireless communication unit 110, and performs authentication to the WLAN 500 using the authentication information by the wireless communication unit 110. Specifically, the control unit 130 controls a relay process of relaying messages transmitted and received between the WWAN terminal 200 and the WLAN 500 for an authentication process to be performed by the WWAN terminal 200. For example, the control unit 130 transmits a message (first message) for authentication to the WLAN 500, which has been received by the wireless communication unit 110, to the WWAN terminal 200 by the wireless communication unit 110. This message is, for example, a message requesting generation of authentication information. In addition, the control unit 130 transmits a message (second message) including authentication information generated by the WWAN terminal 200, which has been received from the WWAN terminal 200 by the wireless communication unit 110, to the base station 510 operating the WLAN 500 by the wireless communication unit 110.

The messages relayed by the WLAN terminal 100 may be messages for an authentication process using extensible authentication protocol (EAP). For example, the first message may be EAP-Request/Identity, and the second message may be EAP-Response/Identity. Further, the first message may be EAP-Request/AKA-Challenge, and the second message may be EAP-Response/AKA-Challenge. In this specification, description is given on an example in which EAP-AKA is used as on example of an authentication protocol, but another authentication protocol using subscriber information for an authentication process, such as EAP-SIM or EAP-AKA', may be used.

Through the above-described relay process, the control unit 130 can cause the WWAN terminal 200 to, as a proxy, perform an authentication process to the WLAN 500 using EAP. Therefore, the WLAN terminal 100 can connect to the WLAN 500 easily even without subscriber identification information.

Moreover, the control unit 130 receives network information for connecting to the WLAN 500 by the wireless communication unit 110, and connects to the WLAN 500 on the basis of the received network information. This network information may be received from the WWAN terminal 200, for example, directly or indirectly via another apparatus. Here, a terminal with a WWAN communication function can receive network information provided by the network information providing server 350, for example, but a terminal without a WWAN communication function cannot easily acquire network information. In this respect, the control unit 130 causes the WWAN terminal 200 having a WWAN communication function to, as a proxy, acquire network information. Therefore, the WLAN terminal 100 can connect to the WLAN 500 easily even without a WWAN communication function.

[2-3. Configuration Example of WWAN Terminal]

Figure 5:
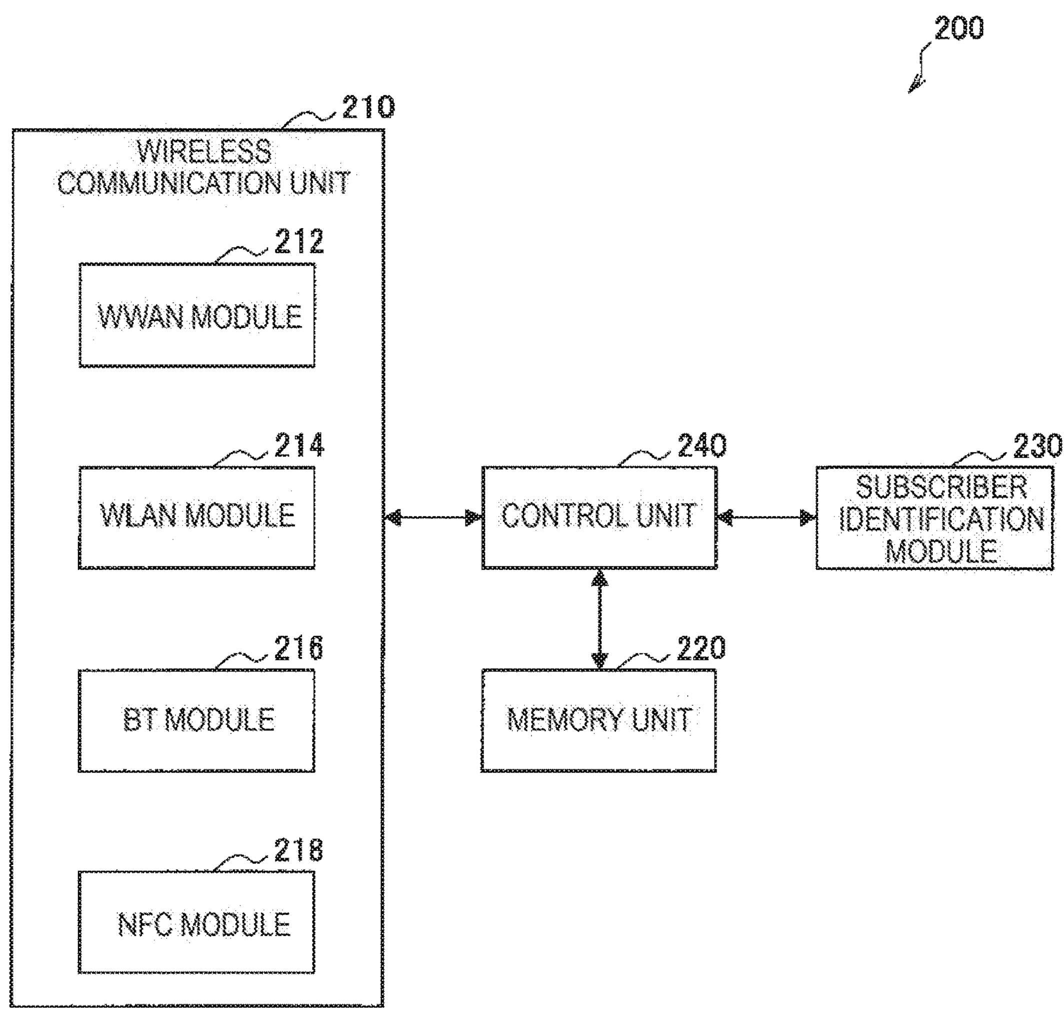
FIG. 5 is a block diagram illustrating an example of a logical configuration of a WWAN terminal according to the present embodiment.

FIG. 5 is a block diagram illustrating an example of a logical configuration of the WWAN terminal 200 according to the present embodiment. As illustrated in FIG. 5, the WWAN terminal 200 includes a wireless communication unit 210, a memory unit 220, a subscriber identification module 230, and a control unit 240.

(1) Wireless Communication Unit 210

The wireless communication unit 210 is a communication module that transmits and receives data to/from an external device. The wireless communication unit 210 can perform wireless communication using various communication schemes. For example, the wireless communication unit 210 includes a WWAN module 212 and is capable of wireless communication using WWAN. The wireless communication unit 220 also includes a WLAN module 214 and is capable of wireless communication using Wi-Fi, or WLAN. The wireless communication unit 210 also includes a BT module 216 and is capable of wireless communication using Bluetooth. The wireless communication unit 210 also includes an NFC module 218 and is capable of wireless communication using NFC.

For example, the wireless communication unit 210 wirelessly communicates with the WLAN terminal 100. For example, the wireless communication unit 210 wirelessly communicates with the WLAN terminal 100 using a near field communication scheme, such as NFC, Bluetooth, or Zigbee (registered trademark). In addition, the wireless communication unit 210 connects to the WWAN 300 to perform wireless communication by the WWAN module 212.

(2) Memory Unit 220

The memory unit 220 performs recording and reproduction of data on a predetermined recording medium. For example, the memory unit 220 stores information received from the WWAN 300 by the wireless communication unit 210.

(3) Subscriber Identification Module 230

The subscriber identification module 230 serves as a storage unit that stores subscriber identification information for the WWAN 300. For example, the subscriber identification module 230 is implemented by a SIM card.

(4) Control Unit 240

The control unit 240 serves as an arithmetic processor and a controller, and controls the overall operation in the apparatus WWAN terminal 200 according to various programs.

For example, the control unit 240 performs an authentication process for authentication of the WLAN terminal 100 to the WLAN 500. Specifically, the control unit 240 generates authentication information based on subscriber identification information stored in the subscriber identification module 230, and transmits the authentication information to the WLAN terminal 100 by the wireless communication unit 210. More specifically, the control unit 240 performs an authentication process on the basis of a message relayed by the WLAN terminal 100. For example, the control unit 240 generates authentication information by performing an authentication process on the basis of a message (first message) for authentication of the WLAN terminal 100 to the WLAN 500, which has been received from the WLAN terminal 100 by the wireless communication unit 210. This message is, for example, a message requesting generation of authentication information. In addition, the control unit 240 transmits a message (second message) including the generated authentication information to the WLAN terminal 100 by the wireless communication unit 210.

The control unit 240 may generate authentication information by performing an authentication process using EAP on the basis of a message relayed by the WLAN terminal 100. As described above, the control unit 240 may perform an authentication process using any authentication protocol using subscriber information for an authentication process, such as EAP-AKA, EAP-SIM, or EAP-AKA'. By receiving a message relayed by the WLAN terminal 100, the control unit 240 can, as a proxy for the WLAN terminal 100, perform an authentication process to the WLAN 500 using EAP. Therefore, even when the WLAN terminal 100 does not have subscriber identification information, the WWAN terminal 200 allows the WLAN terminal 100 to connect to the WLAN 500 easily. Moreover, the WWAN terminal 200 does not transmit subscriber identification information or the like directly to the WLAN terminal 100, which ensures security.

In addition, the control unit 240 transmits a request for network information for the WLAN terminal 100 to connect to the WLAN 500 to the WWAN 300, and transmits the received network information to the WLAN terminal 100 by the wireless communication unit 210. The control unit 240 may, for example, transmit a request to the base station 310, and receive network information provided by the network information providing server 350 from the base station 310. In the case where the WLAN terminal 100 alone cannot easily acquire network information, the control unit 240 can, as a proxy for the WLAN terminal 100, acquire network information provided by the network information providing server 350, and provide the WLAN terminal 100 with the network information.

Moreover, the control unit 240 may transmit Bluetooth connection information for another wireless terminal to establish wireless connection using Bluetooth with the wireless communication unit 210 to the other wireless terminal by the wireless communication unit 210. This Bluetooth connection information may be transferred from the other wireless terminal to further another wireless terminal. The WLAN terminal 100 uses Bluetooth connection information received directly or indirectly from the WWAN terminal 200 to establish wireless connection using Bluetooth with the WWAN terminal 200. This allows the WLAN terminal 100 to transmit and receive messages to/from the WWAN terminal 200 for authentication to the WLAN 500 by using Bluetooth.

The configuration examples of the wireless communication system 1, the WLAN terminal 100, and the WWAN terminal 200 have been described above. Now, an operation process by the wireless communication system 1 according to the present embodiment will be described.

3. OPERATION PROCESS

[3-1. Connection Process Sequence 1]

Figure 6A:
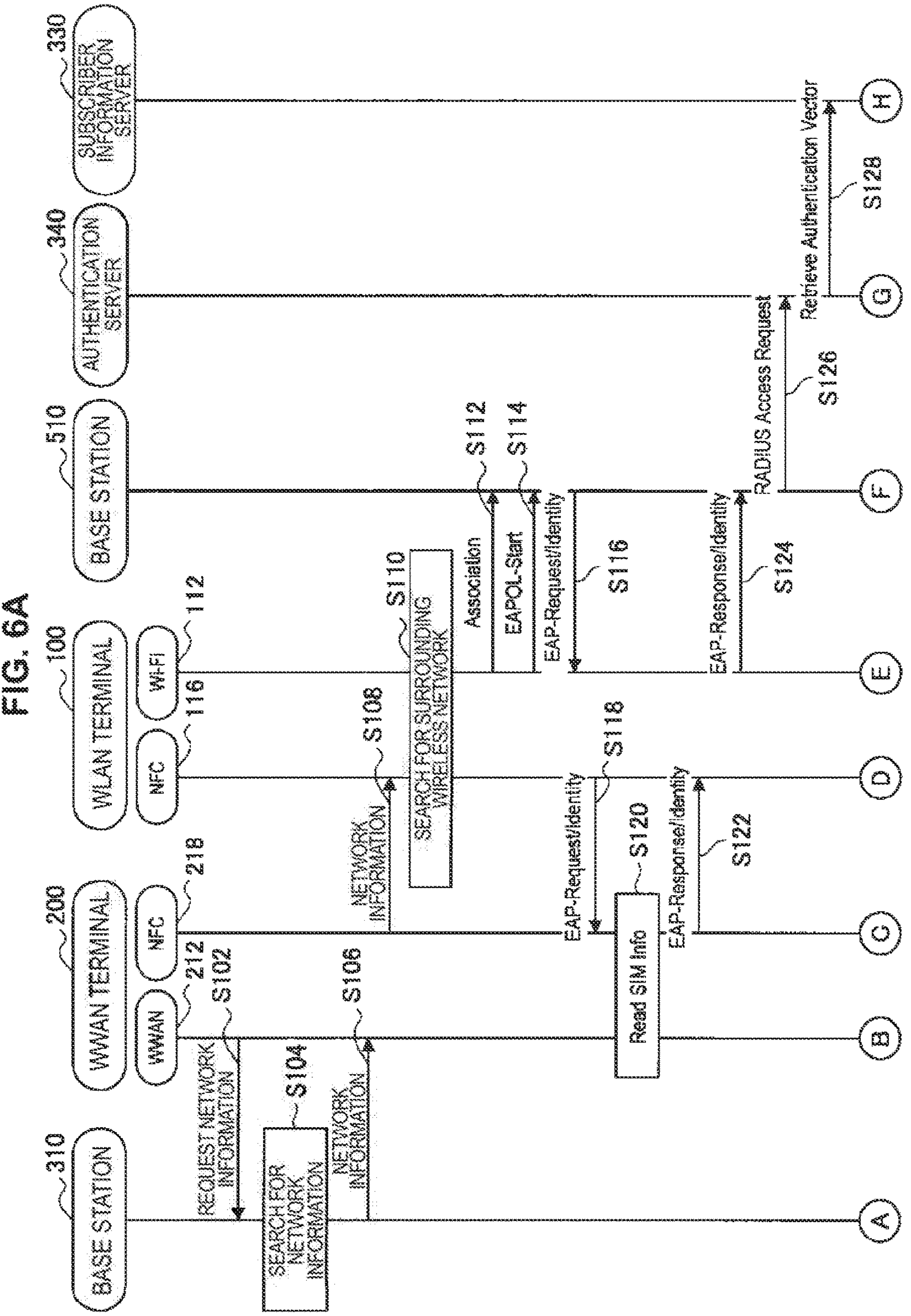
FIG. 6A is a sequence diagram illustrating an example of the flow of a connection process executed in a wireless communication system according to the present embodiment.
Figure 6B:
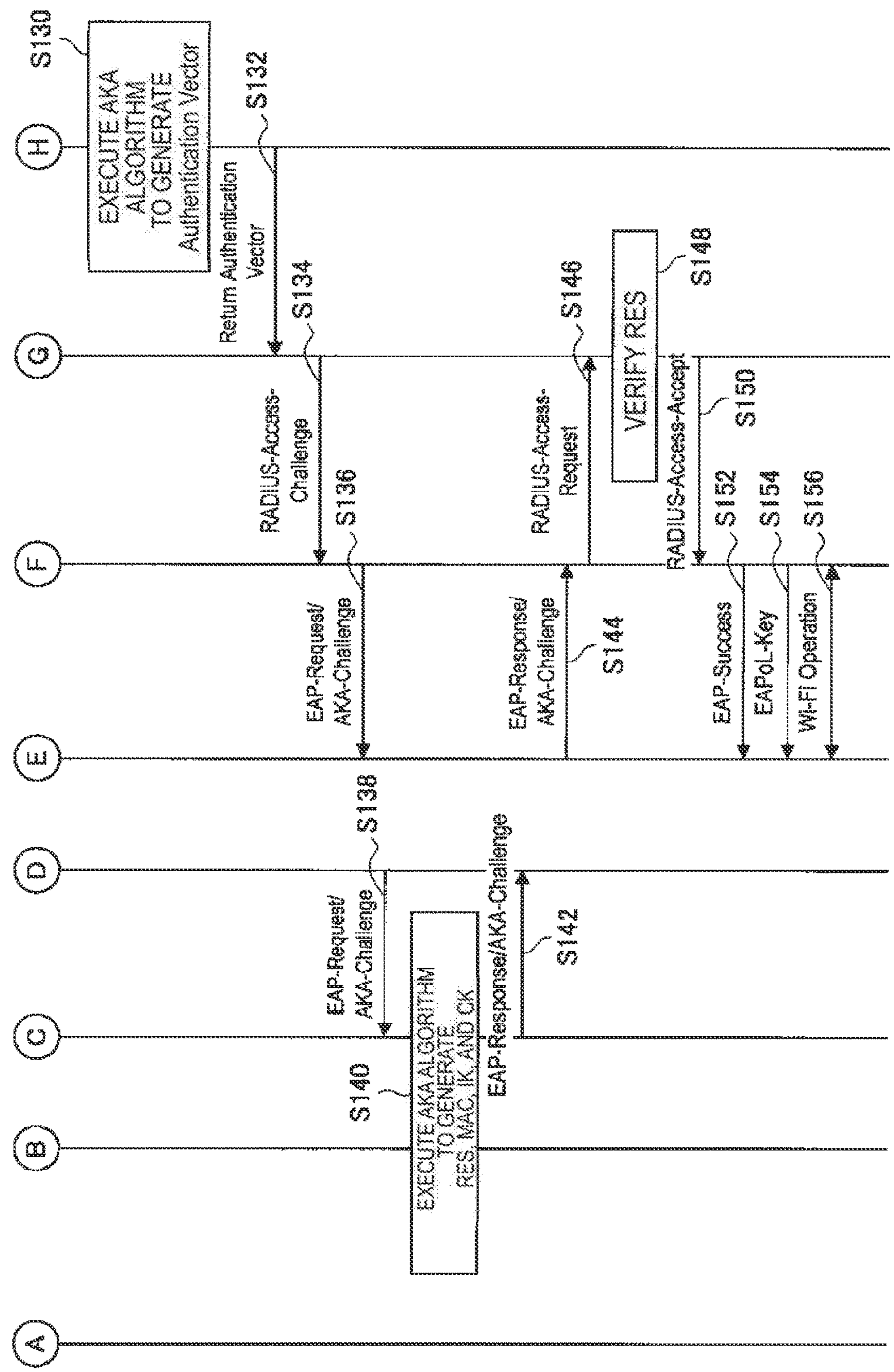
FIG. 6B is a sequence diagram illustrating an example of the flow of a connection process executed in a wireless communication system according to the present embodiment.

In this connection process sequence, the WWAN terminal 200 relays messages for EAP authentication using NFC. FIGS. 6A and 6B are sequence diagrams illustrating an example of the flow of a connection process executed in the wireless communication system 1 according to the present embodiment. Hereinafter FIGS. 6A and 6B are also collectively called FIG. 6 when they need not be distinguished from each other. This sequence involves the base station 310, the WWAN terminal 200, the WLAN terminal 100, the base station 510, the authentication server 340, and the subscriber information server 330. With regard to the WLAN terminal 100 and the WWAN terminal 200, a communication module used for exchanging messages is described with the word "module" omitted. For example, messages whose starting point or endpoint is the WLAN (Wi-Fi) module 112 indicate messages transmitted and received by the WLAN module 112. The same applies to the NFC module 116, the WWAN module 212, and the NFC module 218.

As illustrated in FIG. 6A, first, in step S102, the WWAN terminal 200 transmits a request for network information to the base station 310. Specifically, the WWAN terminal 200 requests network information on an available wireless network from the network information providing server 350 in the WWAN 300. The request may be triggered when, for example, a user brings the WWAN terminal 200 close to the WLAN terminal 100 and NFC communication is performed. This request may include, for example, a network type of a wireless network for which network information is requested, position information on the WWAN terminal 200, a cell ID of a mobile communication network to which the WWAN terminal 200 is connected, and information indicating the current date and time. The position information may be acquired by a global positioning system (GPS) technology or the like. Table 1 below shows an example of information included in the request.

TABLE 1

| Access Network Type | Geo Location | Date & Time |
|---|---|---|
| WLAN | Latitude: Lat_A<br>Longitude: Lon_A | Monday: 1:30 PM |

Here, "Access Network Type" indicates a network type. As the network type, for example, information indicating a communication scheme, such as WLAN, WiMAX, or Bluetooth, may be included. "Geo Location" indicates position information. As the position information, for example, longitude information and latitude information may be included. "Date & Time" indicates the current time information. As the time information, for example, information indicating year, month, and date, day of week, time, etc. may be included.

Then, in step S104, the base station 310 searches for network information. Specifically, the base station 310 transfers the request received from the WWAN terminal 200 to the network information providing server 350. The network information providing server 350 searches a database of network information that it retains for network information available to the WWAN terminal 200. Table 2 below shows an example of network information that the network information providing server 350 retains.

TABLE 2

| ID | Access Network Type | Access Network Property | Geo Location | Available Date & Time | Priority |
|---|---|---|---|---|---|
| 1 | WLAN | HESSID: HESSID_1 ESSID: ESSID_1 BSSID: BSSID_1 Channel: 1 | AnchorLatitude: Lat_1 AnchorLongitude: Long_1 Radius: 30 | Weekday: 9 AM-10 PM Weekend: 12 AM-0 AM | 7 |
| 2 | WLAN | HESSID: HESSID_2 ESSID: ESSID_2 BSSID: BSSID_2 Channel: 6, 36 | AnchorLatitude: Lat_2 AnchorLongitude: Long_2 Radius: 50 | Weekday: 8 AM-11 PM Weekend: 8 AM-11 PM | 8 |

Here, "ID" indicates a network information identifier, which is an identifier for uniquely specifying network information. "Access Network Type" indicates a network type. "Access Network Property" indicates detailed information on a network. In WLAN, detailed information may include, for example, information indicating the following.

HESSID (Homogeneous Extended Service Set Identifier)

ESSID (Extended Service Set Identifier)

BSSID (Basic Service Set Identifier)

Channel (operation channel)

"Geo Location" is area information indicating an area where the network is available. For example, GPS position information (AnchorLatitude and AnchorLongitude) on the central point of the area and information indicating an effective radius from that point may be included. The area information may be information indicating a cell ID. "Available Date & Time" indicates information on time when the network is available. As the time information, for example, information indicating a time slot, a weekday, a holiday, day of week, a.m., p.m., etc. may be included. "Priority" is information indicating priority in selecting the network as a connection destination. For example, a number indicating a degree of priority may be included, larger numbers indicating higher priority.

Next, in step S106, the base station 310 transmits network information found by the network information providing server 350 to the WWAN terminal 200. Assume that this network information includes network information on the WLAN 500.

Then, in step S108, the WWAN terminal 200 transfers the network information to the WLAN terminal 100. The control unit 240 may filter the network information on the basis of position information on the WLAN terminal 100 and a telecommunications standard that the WLAN terminal 100 supports, and transmit only network information related to a network to which the WLAN terminal 100 is connectable to the WLAN terminal 100.

Next, in step S110, the WLAN terminal 100 searches for a surrounding wireless network using the received network information, and detects a base station of a connection destination. For example, the control unit 130 preferentially scans operation channels included in the network information. The control unit 130 may scan all the operation channels if the target wireless network is not detected. Assume that, through such a detection process, the control unit 130 has detected the base station 510 operating the WLAN 500 as a connection destination.

Then, in step S112, the WLAN terminal 100 performs association with the base station 510. By the association, the WLAN terminal 100 establishes logical connection for an authentication process. The WLAN terminal 100 cannot yet perform operation other than an authentication process, such as data communication. In the following steps, the wireless communication system 1 performs an EAP authentication process.

First, in step S114, the WLAN terminal 100 transmits EAPoL-Start to the base station 510.

Then, in step S116, the base station 510 transmits EAP-Request/Identity to the WLAN terminal 100.

Next, in step S118, the WLAN terminal 100 transmits EAP-Request/Identity received in step S116 to the WWAN terminal 200. This message requests the WWAN terminal 200 to generate Identity needed in EAP-AKA.

Then, in step S120, the WWAN terminal 200 generates Identity referring to its own subscriber identification module 230. For example, the control unit 240 generates Identity on the basis of information recorded on a SIM card serving as the subscriber identification module 230. In the case where the authentication protocol is EAP-AKA. Identity is generated on the basis of IMSI.

IMSI has the following format.

<MCC:3 digits><MNC:2 or 3 digits><MSIN:10 digits at maximum>

Here, Mobile Country Code (MCC) is information indicating a country, Mobile Network Code (MNC) is information indicating a carrier, and Mobile Subscriber Identification Number (MSIN) is information indicating a subscriber identification code.

Identity has the following format.

0<IMSI>@wlan.mnc<MNC>.mcc<MCC>.3gppnetwork.org

For example, assuming that MNC has three digits and IMSI is "123456012345678", Identity is "0123456012345678@wlan.mnc456.mcc123.3gppnetwork.org". Description has been given on the Identity generation process in step S120.

Next, in step S122, the WWAN terminal 200 returns EAP-Response/Identity to the WLAN terminal 100. This message stores Identity generated in step S120.

Then, in step S124, the WLAN terminal 100 transfers the received EAP-Response/Identity to the base station 510.

Next, in step S126, the base station 510 transmits RADIUS-Access-Request to the authentication server 340. This message stores Identity generated by the WWAN terminal 200.

Then, in step S128, the authentication server 340 transmits Retrieve-Authentication-Vector to the subscriber information server 330, to request an authentication vector for Identity. This message stores Identity generated by the WWAN terminal 200. An authentication vector is a set of information needed in authenticating a terminal that has connected, and includes the following information in EAP-AKA.

RAND: A random value. Used as a challenge.

AUTN: A value for a terminal to authenticate a network.

XRES: A response value expected in response to a challenge.

IK: Message integrity verification key.

CK: Message encryption key.

Next, as illustrated in FIG. 6B, in step S130, the subscriber information server 330 executes AKA algorithm to generate an authentication vector corresponding to Identity stored in the received message.

Then, in step S132, the subscriber information server 330 transmits the generated authentication vector to the authentication server 340.

Next, in step S134, the authentication server 340 transmits RADIUS-Access-Challenge to the base station 510. This message stores the authentication vector generated by the subscriber information server 330. Here, the authentication server 340 newly calculates Message Authentication Code (MAC), and adds it to the message. This MAC is used for the WLAN terminal 100 to verify the integrity of the message.

Then, in step S136, the base station 510 transmits EAP-Request/AKA-Challenge to the WLAN terminal 100. This message includes RAND and AUTN of the authentication vector, and MAC. XRES, IK, and CK of the authentication vector are retained by the base station 510, not being transmitted to the WLAN terminal 100.

Next, in step S138, the WLAN terminal 100 transmits EAP-Request/AKA-Challenge to the WWAN terminal 200. This message requests the WWAN terminal 200 to generate a response value (RES) and session keys (IK, CK).

Then, in step S140, the WWAN terminal 200 executes AKA algorithm to generate RES, MAC, and session keys (IK, CK) corresponding to the received EAP-Request/AKA-Challenge.

Next, in step S142, the WWAN terminal 200 transmits EAP-Response/AKA-Challenge to the WLAN terminal 100. This message stores RES, MAC, and the session keys generated by the WWAN terminal 200.

Then, in step S144, the WLAN terminal 100 transfers the received EAP-Response/AKA-Challenge to the base station 510.

Next, in step S146, the base station 510 transmits RADIUS-Access-Request to the authentication server 340. This message stores RES, MAC, and the session keys (IK, CK) generated by the WWAN terminal 200.

Then, in step S148, the authentication server 340 verifies the received RES. Specifically, the authentication server 340 verifies the integrity of the message on the basis of the coincidence between RES generated by the WWAN terminal 200 and XRES generated by the subscriber information server 330, and MAC.

Next, in step S150, the authentication server 340 transmits RADIUS-Access-Accept to the base station 510. This message indicates permission for connection.

Then, in step S152, the base station 510 transmits EAP-Success to the WLAN terminal 100. This message reports to the WLAN terminal 100 that the authentication process has succeeded.

Next, in step S154, the base station 510 transmits EAPoL-Key to the WLAN terminal 100. This message sends a key for encrypted communication to be used between the WLAN terminal 100 and the base station 510.

Through the above-described EAP authentication process, connection for WLAN communication is completed between the WLAN terminal 100 and the base station 510 in step S156. Thus, data communication using Wi-Fi, for example, is started between the WLAN terminal 100 and the base station 510.

According to this connection process sequence, the WLAN terminal 100 transmits and receives messages to/from the WWAN terminal 200 by the NFC module 116. Specifically, in step S108, the wireless communication unit 110 receives network information for connecting to the WLAN 500 by using NFC. In addition, in steps S118, S122, S138, and S142, the wireless communication unit 110 transmits and receives messages for authentication to the WLAN 500 to/from the WWAN terminal 200 by using NFC. Therefore, the WLAN terminal 100 can authenticate to the WLAN 500 by coming close to the WWAN terminal 200, for example, and thus can connect to the Internet easily. Moreover, there is no need for a user to perform any input for authentication to the WLAN 500 on the WLAN terminal 100, which leads to improved user convenience.

[3-2. Connection Process Sequence 2]

Figure 7A:
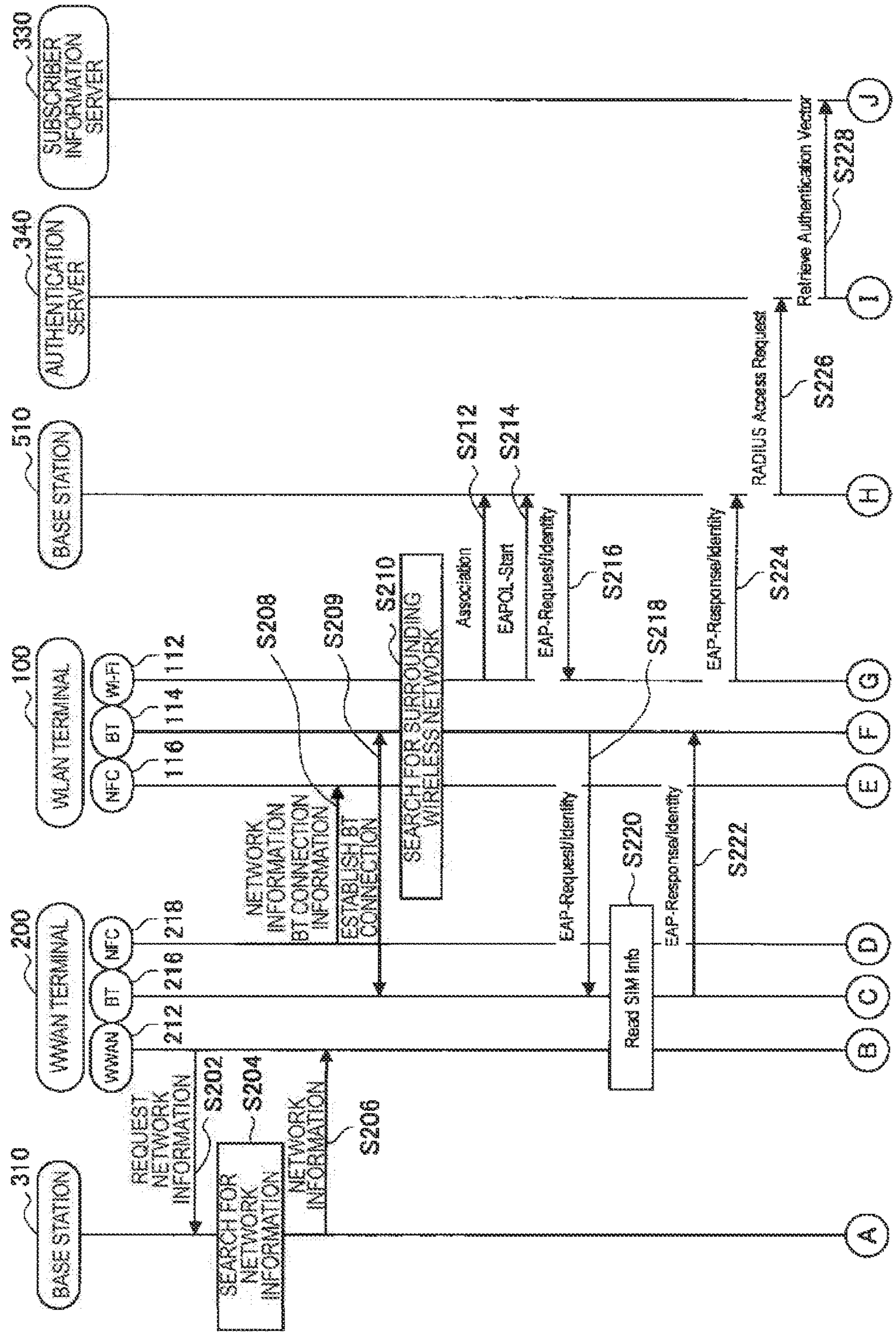
FIG. 7A is a sequence diagram illustrating an example of the flow of a connection process executed in a wireless communication system according to the present embodiment.
Figure 7B:
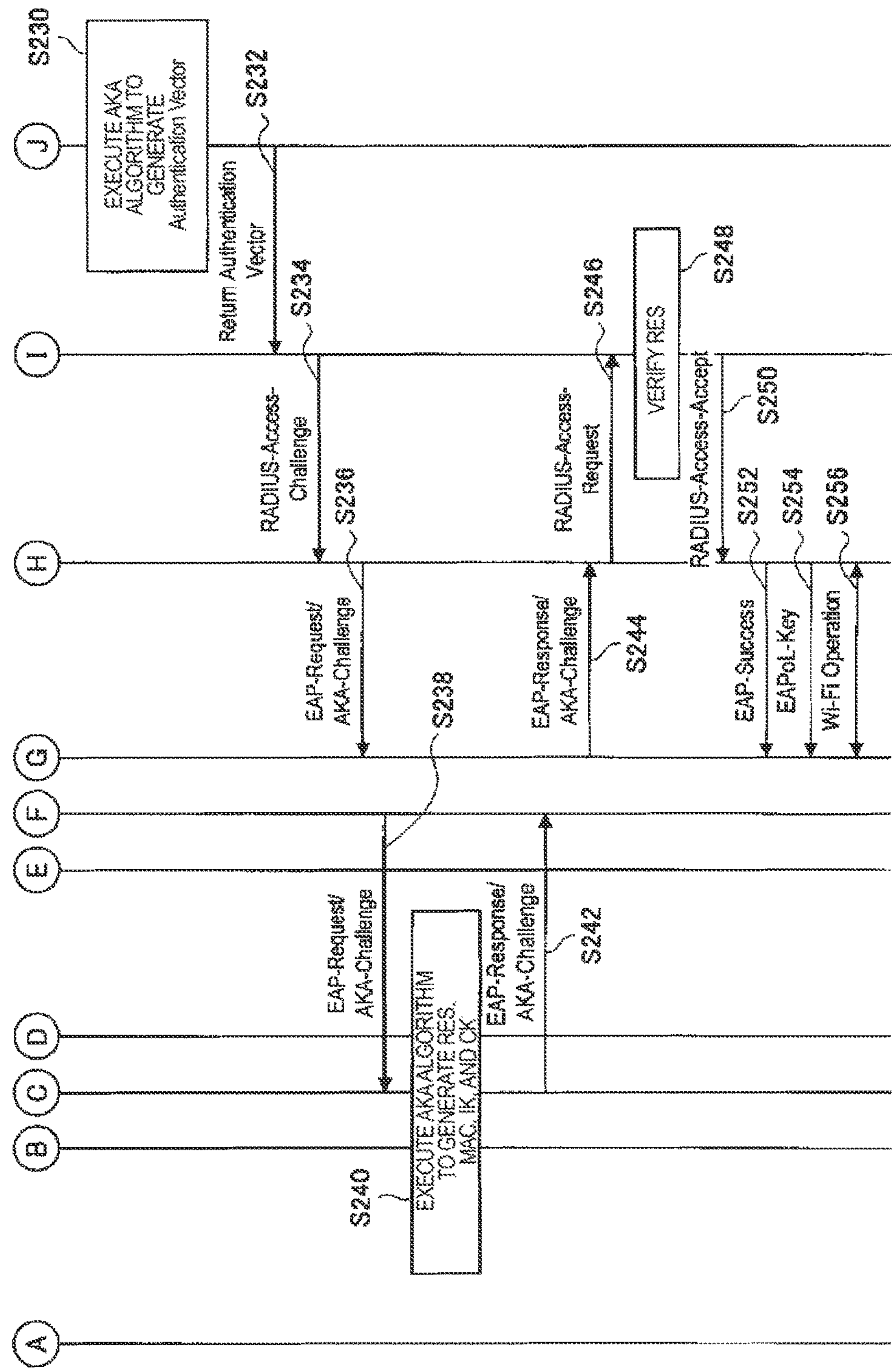
FIG. 7B is a sequence diagram illustrating an example of the flow of a connection process executed in a wireless communication system according to the present embodiment.

In this connection process sequence, the WWAN terminal 200 relays messages for EAP authentication using Bluetooth. FIGS. 7A and 7B are sequence diagrams illustrating an example of the flow of a connection process executed in the wireless communication system 1 according to the present embodiment. Hereinafter, FIGS. 7A and 7B are also collectively called FIG. 7 when they need not be distinguished from each other. This sequence involves the base station 310, the WWAN terminal 200, the WLAN terminal 100, the base station 510, the authentication server 340, and the subscriber information server 330. With regard to the WLAN terminal 100 and the WWAN terminal 200, as in FIG. 6, a communication module used for exchanging messages is described with the word "module" omitted.

As illustrated in FIG. 7A, first, in step S202, the WWAN terminal 200 transmits a request for network information to the base station 310. Then, in step S204, the base station 310 searches for network information. Next, in step S206, the base station 310 transmits network information found by the network information providing server 350 to the WWAN terminal 200. These processes are similar to the processes in steps S102 to S106 described with reference to FIG. 6, and thus are not repeatedly described.

Then, in step S208, the WWAN terminal 200 transfers the network information and Bluetooth connection information to the WLAN terminal 100. Bluetooth connection information includes the following information, for example.

OOB Data Length (LENGTH)

Device Address (BD_ADDR)

Class of Device

Service Class UUID

Bluetooth Local Name

Then, in step S209, the WLAN terminal 100 establishes wireless connection using Bluetooth with the WWAN terminal 200. Specifically, the control unit 130 establishes wireless connection using Bluetooth with the WWAN terminal 200 by the wireless communication unit 110, on the basis of Bluetooth connection information that has been received by the wireless communication unit 110 in step S208.

Next, in step S210, the WLAN terminal 100 searches for a surrounding wireless network using the received network information, and detects a base station of a connection destination. Then, in step S212, the WLAN terminal 100 performs association with the base station 510. These processes are similar to the processes in steps S110 and S112 described with reference to FIG. 6, and thus are not repeatedly described.

Subsequently, in steps S214 to S228, and steps S230 to S254 illustrated in FIG. 7B, an EAP authentication process is performed, and connection for WLAN communication is completed between the WLAN terminal 100 and the base station 510 in step S256. The EAP authentication process is similar to the EAP authentication process in steps S114 to S154 described with reference to FIG. 6, and thus is not repeatedly described. Note that in this connection sequence, unlike in the EAP authentication process described with FIG. 6, transmission and reception of messages between the WLAN terminal 100 and the WWAN terminal 200 are performed using Bluetooth. Specifically, in steps S218, S222, S238, and S242, the wireless communication unit 110 of the WLAN terminal 100 transmits and receives messages for authentication to the WLAN 500 to/from the WWAN terminal 200 by using Bluetooth.

According to this connection process sequence, the WLAN terminal 100 can authenticate to the WLAN 500 by coming close to the WWAN terminal 200, for example, and thus can connect to the Internet easily. Here, in the connection process sequence 1 described above with reference to FIG. 6, since messages for EAP authentication are transmitted and received using NFC, the WLAN terminal 100 and the WWAN terminal 200 need to be kept close to each other until the authentication process is completed. In this respect, in this connection process sequence, after the transfer of network information using NFC in step S208, messages for EAP authentication are transmitted and received using Bluetooth, whose communication available distance is longer than that of NFC. Therefore, after the information transfer using NFC, the WLAN terminal 100 and the WWAN terminal 200 need not be close to each other, which leads to further improved user convenience.

[3-3. Connection Process Sequence 3]

Figure 8:
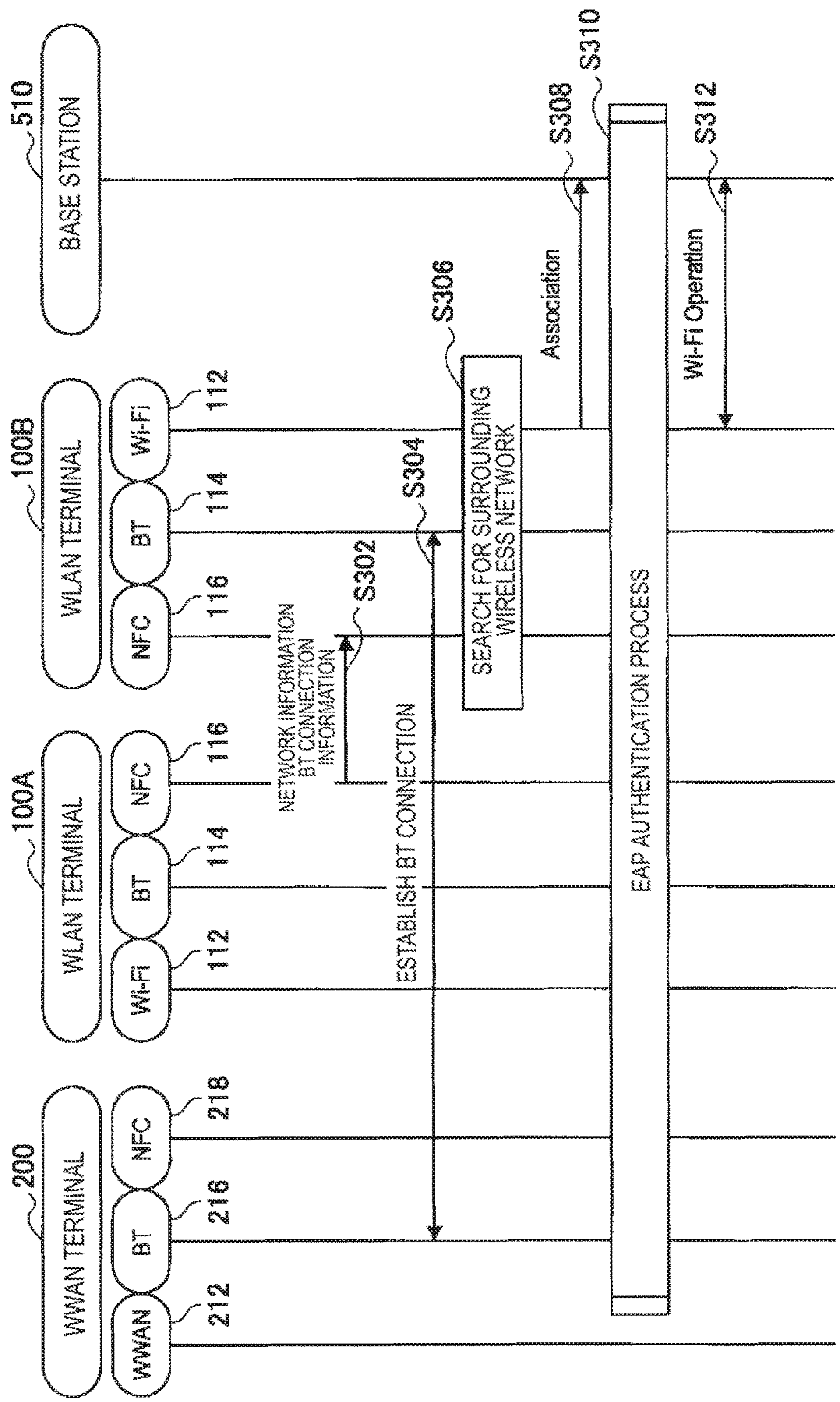
FIG. 8 is a sequence diagram illustrating an example of the flow of a connection process executed in a wireless communication system according to the present embodiment.

In this connection process sequence, the WLAN terminal 100 indirectly receives network information and Bluetooth connection information on the WWAN terminal 200. FIG. 8 is a sequence diagram illustrating an example of the flow of a connection process executed in the wireless communication system 1 according to the present embodiment. This sequence involves the WWAN terminal 200, WLAN terminals 100A and 100B, and the base station 510. With regard to the WLAN terminals 100A and 100B and the WWAN terminal 200, as in FIG. 6, a communication module used for exchanging messages is described with the word "module" omitted.

As an initial state, assume that the WLAN terminal 100A is connected to the WLAN 500 through the EAP authentication process based on the connection process sequence 2, which is described above with reference to FIG. 7, and that in the WLAN terminal 100A, network information and Bluetooth connection information received in step S208 are stored in the memory unit 120.

As illustrated in FIG. 8, first, in step S302, the WLAN terminal 100A transmits network information and Bluetooth connection information to the WLAN terminal 100B. Specifically, the control unit 130 of the WLAN terminal 100A transmits the network information and Bluetooth connection information to the WLAN terminal 100B by the wireless communication unit 110. The network information and Bluetooth connection information had been received from the WWAN terminal 200 in step S208 and stored in the memory unit 120 of the WLAN terminal 100A.

Then, in step S304, the WLAN terminal 100B establishes wireless connection using Bluetooth with the WWAN terminal 200 using the received Bluetooth connection information. Next, in step S306, the WLAN terminal 100B searches for a surrounding wireless network using the received network information, and detects a base station of a connection destination. Then, in step S308, the WLAN terminal 100B performs association with the base station 510. These processes are similar to the processes in steps S209, S210, and S212 described with reference to FIG. 7, and thus are not repeatedly described.

Subsequently, in step S310, an EAP authentication process is performed, and connection for WLAN communication is completed between the WLAN terminal 100B and the base station 510 in step S312. The EAP authentication process is similar to the EAP authentication process in steps S214 to S254 described with reference to FIG. 7, and thus is not repeatedly described. In this EAP authentication process, the WLAN terminal 100B relays messages for the EAP authentication process by the WWAN terminal 200, as described above with reference to FIG. 7.

According to this connection process sequence, the WLAN terminal 100B can authenticate to the WLAN 500 by coming close to the WLAN terminal 100A, for example, and thus can connect to the Internet easily. Here, in the connection process sequence 2 described above with reference to FIG. 7, the WLAN terminal 100 receives network information and Bluetooth connection information directly from the WWAN terminal 200. In this respect, in this connection sequence, since the WLAN terminal 100B receives the information from the WLAN terminal 100A, the WLAN terminal 100B need not be directly close to the WWAN terminal 200, which leads to further improved user convenience.

In the above example, as the initial state, the WLAN terminal 100A is described to be connected to the WLAN 500; however, the technology according to the present disclosure is not limited to this example. As long as having network information and Bluetooth connection information stored therein, the WLAN terminal 100A may be once connected to the WLAN 500 and then disconnected, or may never be connected to the WLAN 500. Further, network information and Bluetooth connection information may be transferred a plurality of times.

[3-4. Tethering Process Sequence]

In the case where connection between the WLAN terminal 100 and the WLAN 500 established by the above connection process sequence ends, the WLAN terminal 100 can reconnect to the Internet by tethering using the WWAN terminal 200. Hereinafter, a tethering process sequence will be described with reference to FIG. 9.

Figure 9:
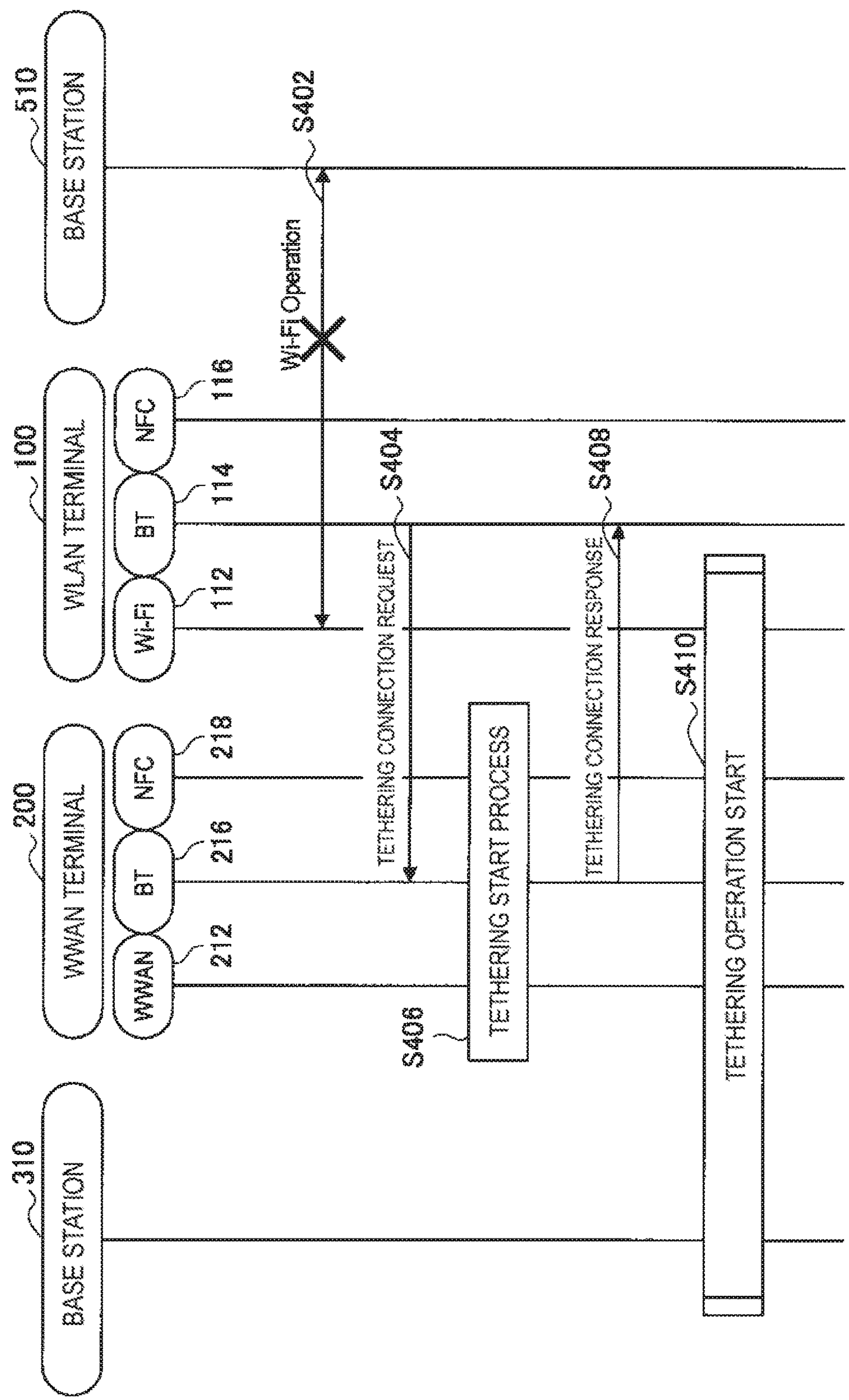
FIG. 9 is a sequence diagram illustrating an example of the flow of a tethering process executed in a wireless communication system according to the present embodiment.

FIG. 9 is a sequence diagram illustrating an example of the flow of a tethering process executed in the wireless communication system 1 according to the present embodiment. This sequence involves the base station 310, the WWAN terminal 200, the WLAN terminal 100, and the base station 510. With regard to the WLAN terminal 100 and the WWAN terminal 200, as in FIG. 6, a communication module used for exchanging messages is described with the word "module" omitted.

As an initial state, assume that the WLAN terminal 100 is connected to the WLAN 500 through the EAP authentication process based on the connection process sequence 2, which is described above with reference to FIG. 7, or the connection process sequence 3, which is described above with reference to FIG. 8.

As illustrated in FIG. 9, first, in step S402, connection between the WLAN terminal 100 and the WLAN 500 ends. A trigger for the end may be, for example, the WLAN terminal 100 going out of a communication available area of the base station 510, or a service of the WLAN 500 provided by the base station 510 going beyond service time.

Then, in step S404, the WLAN terminal 100 transmits a tethering connection request to the WWAN terminal 200. In the example illustrated in FIG. 9, a Bluetooth communication path constructed in the connection process (S209 of FIG. 7 or S304 of FIG. 8) is used for the tethering connection request. Alternatively, when a Bluetooth communication path is not constructed (e.g., in the case of connection to the WLAN 500 through the EAP authentication process using NFC by the connection process sequence 1 described above with reference to FIG. 6), the tethering connection request may be transmitted using NFC.

Next, in step S406, the WWAN terminal 200 performs a tethering start process. Specifically, the control unit 240 causes the WWAN terminal 200 to serve as a WLAN access point, and starts preparation for relaying communication of another terminal having a WLAN communication function to the WWAN 300.

Then, in step S408, the WWAN terminal 200 transmits a tethering connection response to the WLAN terminal 100. In the example illustrated in FIG. 9, Bluetooth is used for the tethering connection response, as with the tethering connection request, but NFC may be used. The tethering connection response is a message reporting the completion of the tethering start process. This message includes connection information on the WLAN access point constructed by the WWAN terminal 200. The connection information on the WLAN access point includes the following information, for example.

SSID: (1-32 letters)

Security: Open/WPA-PSK/WPA2-PSK

Passphrase: (8-63 letters)

Operation channel

Then, in step S410, the WLAN terminal 100 starts tethering operation. Specifically, the WLAN terminal 100 accesses the WWAN terminal 200 on the basis of the received connection information on the WLAN access point, and controls a wireless communication process using the WWAN 300 relayed by the WWAN terminal 200.

According to this tethering process sequence, the WLAN terminal 100 can keep connection to the Internet even after the connection to the WLAN 500 ends. Here, switching of a network as a connection destination is performed without requiring user operation, which leads to further improved user convenience.

[3-5. Network Switching Process Flow]

Figure 10:
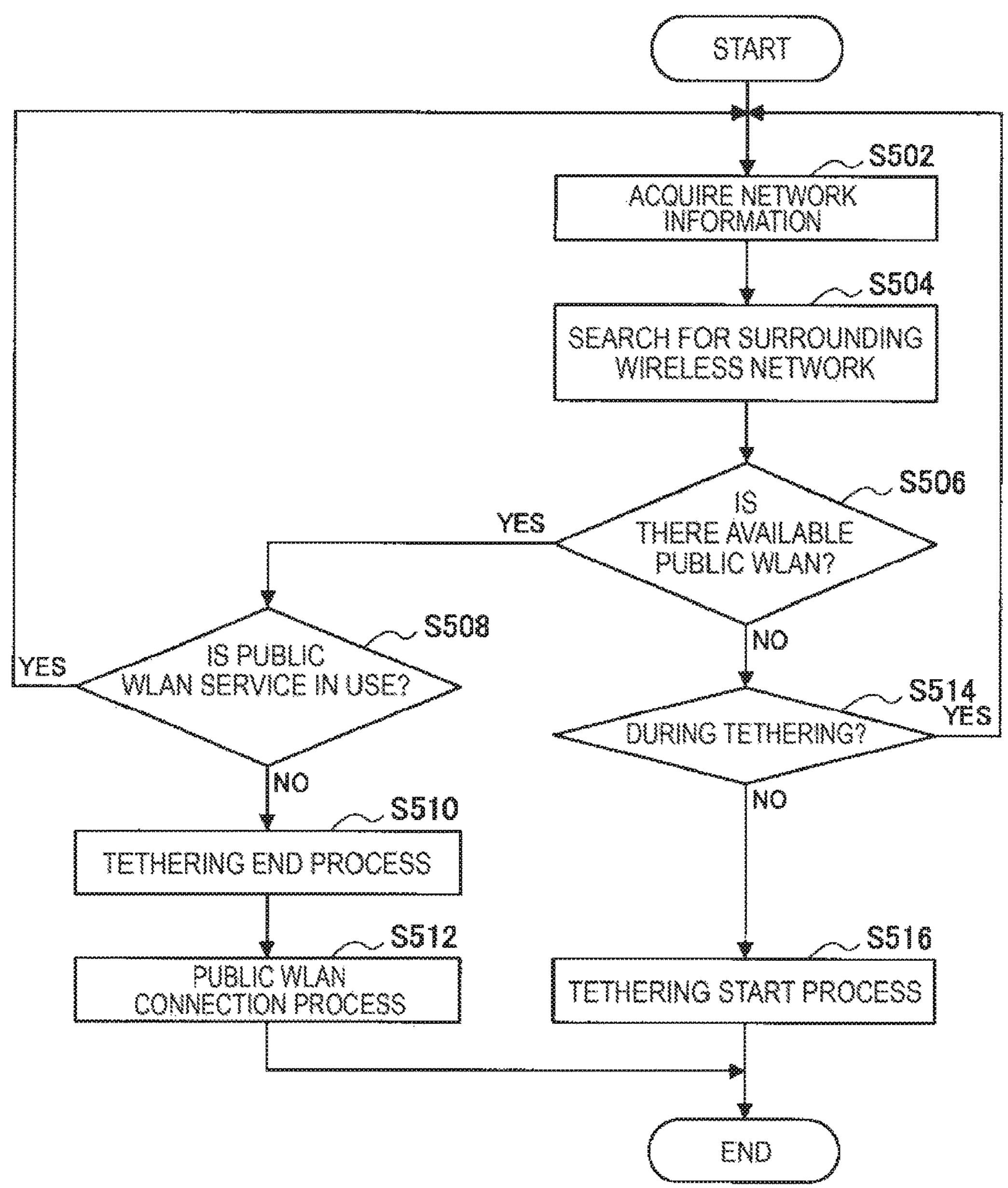
FIG. 10 is a flowchart illustrating an example of the flow of a network switching process executed in a WLAN terminal according to the present embodiment.

The WLAN terminal 100 performs switching of a network as a connection destination (e.g., connecting to a WLAN or using tethering) with any of various events acting as a trigger. Hereinafter, description will be given on determination whether to switch a network as a connection destination, which is made by the WLAN terminal 100, with reference to FIG. 10. FIG. 10 is a flowchart illustrating an example of the flow of a network switching process executed in the WLAN terminal 100 according to the present embodiment.

As illustrated in FIG. 10, first, in step S502, the WLAN terminal 100 acquires network information. Specifically, the WLAN terminal 100 receives, from the network information providing server 350, network information on a network available at the current position at regular intervals. Here, the WLAN terminal 100 may indirectly receive network information via the WWAN terminal 200, or may directly receive network information via the WLAN 500.

Then, in step S504, the WLAN terminal 100 searches for a surrounding wireless network. Specifically, the WLAN terminal 100 searches for the WLAN 500 corresponding to the network information received in step S502, and in step S506, determines whether there is an available WLAN 500 around the WLAN terminal 100.

When it is determined that there is an available WLAN 500 (S506/YES), in step S508, the WLAN terminal 100 determines whether a public WLAN service is currently in use.

When it is determined that a public WLAN service is in use (S508/YES), the process returns to step S502.

When it is determined that a public WLAN service is not in use (S508/NO), in step S510, the WLAN terminal 100 performs a tethering end process. Specifically, the control unit 130 transmits a tethering end request to the WWAN terminal 200 by the wireless communication unit 110, causing the tethering process to end. The tethering end request may be transmitted using either Bluetooth or NFC. This step may be omitted in the case where the WLAN terminal 100 is not during tethering.

Then, in step S512, the WLAN terminal 100 performs a process of connecting to the WLAN 500. This process is as described above with reference to FIGS. 6 to 8, and thus is not repeatedly described.

When it is determined that there is no available WLAN 500 in step S506 (S506/NO), in step S514, the WLAN terminal 100 determines whether tethering is currently in use.

When it is determined that tethering is in use (S514/YES), the process returns to step S502.

When it is determined that tethering is not in use (S514/NO), the WLAN terminal 100 starts tethering. This process is as described above with reference to FIG. 9, and thus is not repeatedly described.

An example of the operation process by the wireless communication system 1 according to the present embodiment has been described above.

4. APPLICATION EXAMPLES

The technology of the present disclosure can be applied to various products. For example, the wireless communication apparatus 100 and the wireless communication apparatus 200 may be implemented as a mobile terminal such as a smartphone, a table-type personal computer (PC), a notebook PC, a portable game terminal, or a digital camera, a fixed-type terminal such as a television receiver set, a printer, a digital scanner, or a network storage, or an in-vehicle terminal such as a car navigation apparatus. In addition, the wireless communication apparatus 100 and the wireless communication apparatus 200 may be implemented as a terminal which performs machine-to-machine (M2M) communication (which is also referred to as a machine-type communication (MTC) terminal) such as a smart meter, a vending machine, a remote monitoring apparatus, or a point-of-sale (POS) terminal. Furthermore, the wireless communication apparatus 100 and the wireless communication apparatus 200 may be a wireless communication module (for example, an integrated circuit module configured in one die) mounted in these terminals.

4-1. First Application Example

Figure 11:
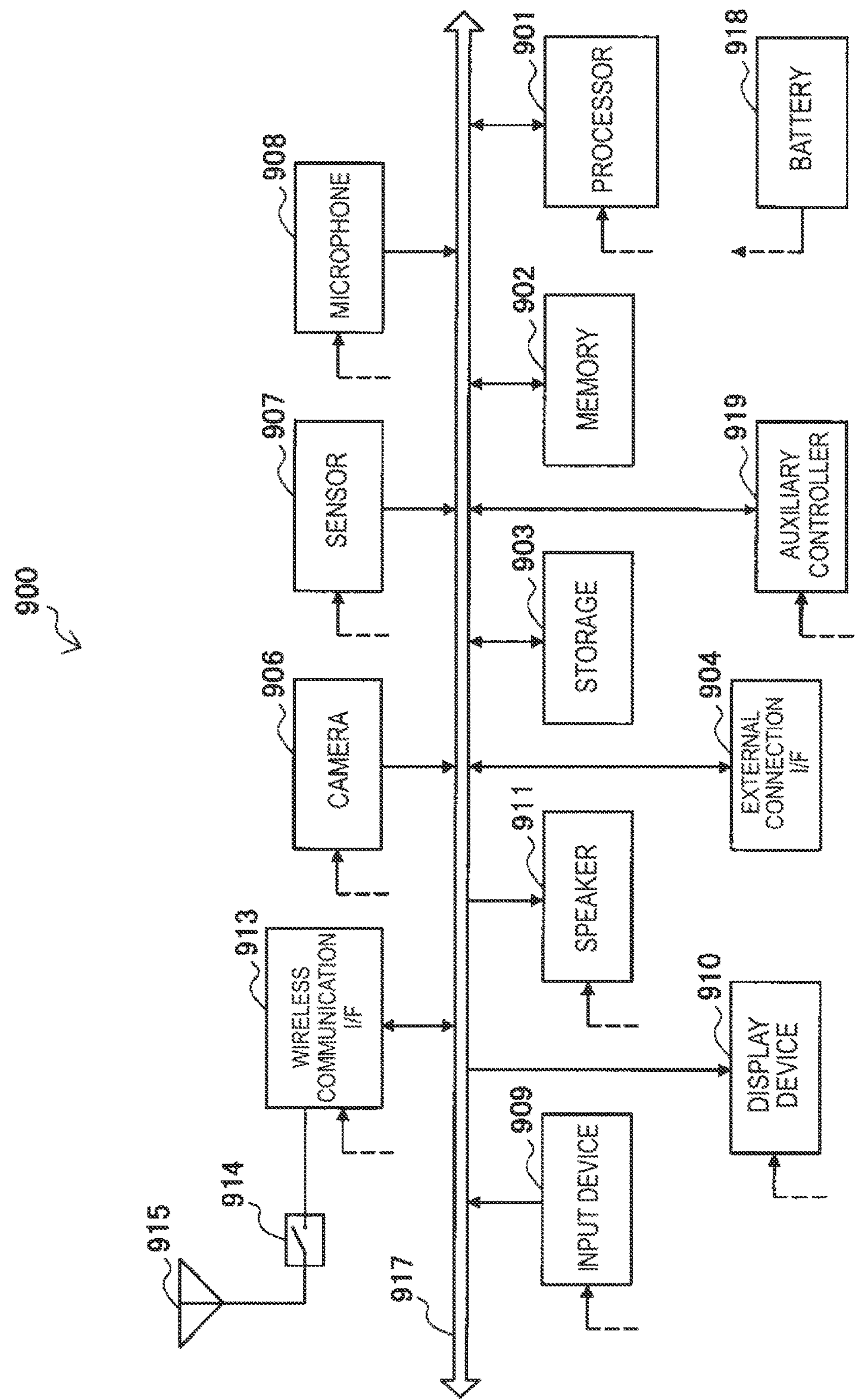
FIG. 11 is a block diagram illustrating an example of a schematic configuration of a smartphone.

FIG. 11 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on a chip (SoC), and controls functions of an application layer and another layer of the smartphone 900. The memory 902 includes a random access memory (RAM) and a read only memory (ROM), and stores a program that is executed by the processor 901, and data. The storage 903 may include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 913 supports one or more of wireless LAN standards such as IEEE 802.11a, 11b, 11g, 11n, 11ac, and 11ad to execute wireless communication. The wireless communication interface 913 can communicate with another apparatus via a wireless LAN access point in an infrastructure mode. In addition, the wireless communication interface 913 can directly communicate with another apparatus in an ad hoc mode or a direct communication mode such as Wi-Fi direct (registered trademark), or the like. In the Wi-Fi Direct, unlike the ad-hoc mode, one of two terminals operates as an access point, but communication is performed directly between the terminals. The wireless communication interface 913 can typically include a baseband processor, a radio frequency (RF) circuit, and a power amplifier. The wireless communication interface 913 may be a one-chip module in which a memory which stores a communication control program, a processor which executes the program and a relevant circuit are integrated. The wireless communication interface 913 may support other kinds of wireless communication schemes such as a near field wireless communication scheme, a proximity wireless communication scheme or a cellular communication scheme in addition to the wireless LAN scheme. The antenna switch 914 switches connection destinations of the antenna 915 between a plurality of circuits (for example, circuits for different wireless communication schemes) included in the wireless communication interface 913. The antenna 915 has a single or a plurality of antenna elements (for example, a plurality of antenna elements which constitute a MIMO antenna), which are used by the wireless communication interface 913 for transmission and reception of radio signals.

It should be noted that the smartphone 900 is not limited to the example of FIG. 11 and may include a plurality of antennas (for example, an antenna for a wireless LAN, or an antenna for the proximity wireless communication scheme, etc.). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to blocks of the smartphone 900 illustrated in FIG. 11 via feeder lines, which are partially shown as dashed lines in the figure. The auxiliary controller 919 operates a minimum necessary function of the smartphone 900, for example, in a sleep mode.

The smartphone 900 illustrated in FIG. 11 may operate as the wireless communication apparatus 100. In that case, for example, the wireless communication unit 110, the memory unit 120, and the control unit 130 described with reference to FIG. 4 may be implemented by the wireless communication interface 913. In addition, at least some of these functions may be implemented by the processor 901 or the auxiliary controller 919. Thus, the smartphone 900 can receive authentication information from another WWAN terminal, and perform authentication to a public WLAN using the received authentication information, thereby connecting to the Internet easily.

The smartphone 900 illustrated in FIG. 11 may operate as the wireless communication apparatus 200. In that case, for example, the wireless communication unit 210, the memory unit 220, the subscriber identification module 230, and the control unit 240 described with reference to FIG. 5 may be implemented by the wireless communication interface 913. In addition, at least some of these functions may be implemented by the processor 901 or the auxiliary controller 919. Thus, the smartphone 900 can generate authentication information based on subscriber identification information and transmit the authentication information to another WLAN terminal, thereby allowing the other WLAN terminal to connect to a public WLAN.

The smartphone 900 may operate as a wireless access point (software AP) by executing an access point function at an application level through the processor 901. Further, the wireless communication interface 915 may have a wireless access point function.

4-2. Second Application Example

Figure 12:
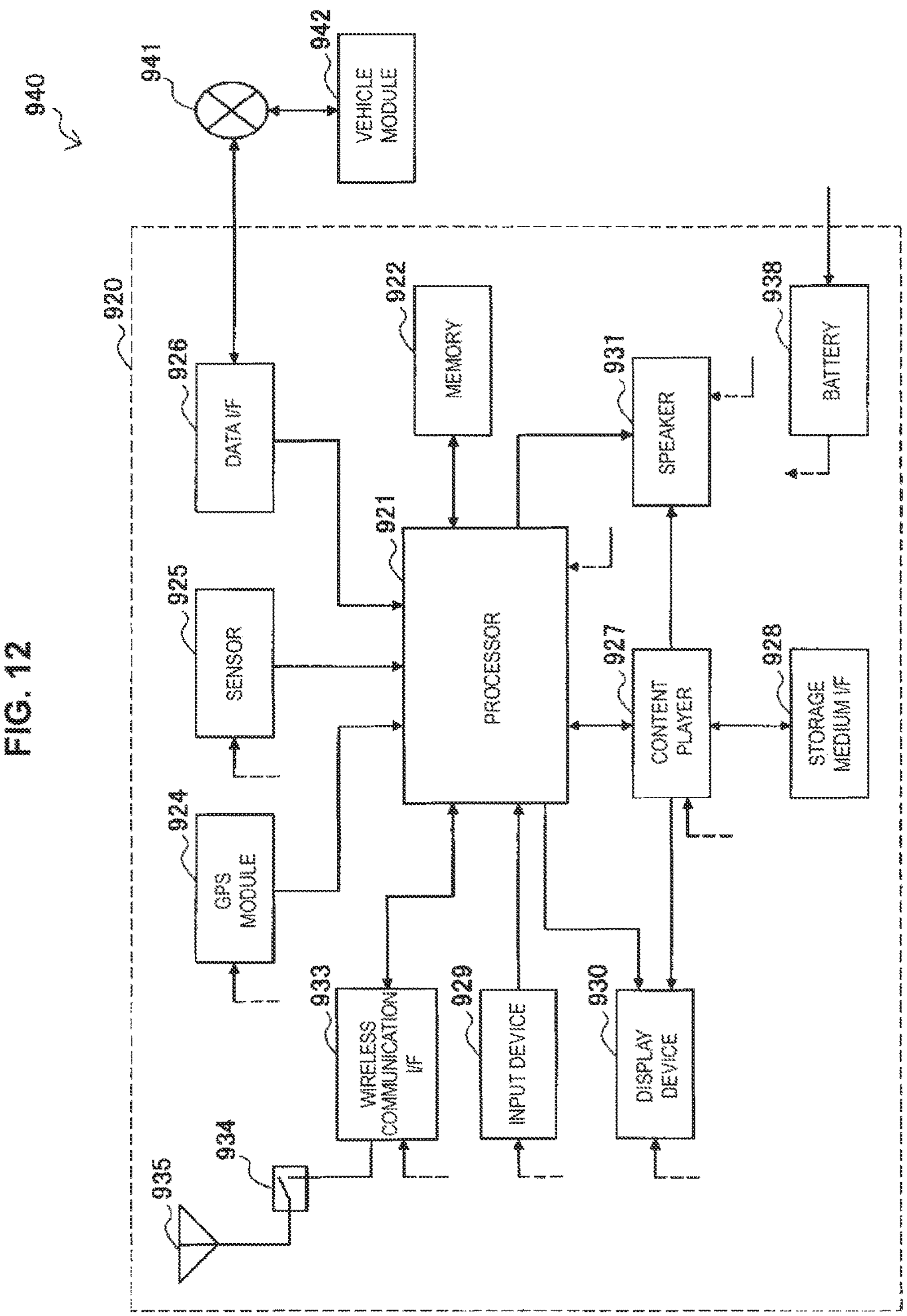
FIG. 12 is a block diagram illustrating an example of a schematic configuration of a car navigation apparatus.

FIG. 12 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 920 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports one or more of wireless LAN standards such as IEEE 802.11a, 11b, 11g, 11n, 11ac, and 11ad to execute wireless communication. The wireless communication interface 933 can communicate with another apparatus via a wireless LAN access point in an infrastructure mode. In addition, the wireless communication interface 933 can directly communicate with another apparatus in an ad hoc mode or a direct communication mode such as Wi-Fi Direct. The wireless communication interface 933 can typically include a baseband processor, an RF circuit, and a power amplifier. The wireless communication interface 933 may be a one-chip module in which a memory which stores a communication control program, a processor which executes the program and a relevant circuit are integrated. The wireless communication interface 933 may support other kinds of wireless communication schemes such as a near field wireless communication scheme, a proximity wireless communication scheme or a cellular communication scheme in addition to the wireless LAN scheme. The antenna switch 934 switches connection destinations of the antenna 935 between a plurality of circuits included in the wireless communication interface 933. The antenna 935 has a single or a plurality of antenna elements, which are used by the wireless communication interface 933 for transmission and reception of radio signals.

In addition, the car navigation apparatus 920 may include a plurality of antennas, not limited to the example of FIG. 12. In that case, the antenna switches 934 may be omitted from the configuration of the car navigation apparatus 920.

The battery 938 supplies power to blocks of the car navigation apparatus 920 illustrated in FIG. 12 via feeder lines that are partially shown as dashed lines in the figure. The battery 938 accumulates power supplied form the vehicle.

The car navigation apparatus 920 illustrated in FIG. 12 may operate as the wireless communication apparatus 100. In that case, for example, the wireless communication unit 110, the memory unit 120, and the control unit 130 described with reference to FIG. 4 may be implemented by the wireless communication interface 933. In addition, at least some of these functions may be implemented by the processor 921. Thus, the car navigation apparatus 920 can receive authentication information from another WWAN terminal, and perform authentication to a public WLAN using the received authentication information, thereby connecting to the Internet easily.

The car navigation apparatus 920 illustrated in FIG. 12 may operate as the wireless communication apparatus 200. In that case, for example, the wireless communication unit 210, the memory unit 220, the subscriber identification module 230, and the control unit 240 described with reference to FIG. 5 may be implemented by the wireless communication interface 933. In addition, at least some of these functions may be implemented by the processor 921. Thus, the car navigation apparatus 920 can generate authentication information based on subscriber identification information and transmit the authentication information to another WLAN terminal, thereby allowing the other WLAN terminal to connect to a public WLAN.

The technology of the present disclosure may also be implemented as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

5. CONCLUSION

Hereinbefore, an embodiment of the technology according to the present disclosure has been described in detail with reference to FIGS. 1 to 12. According to the above-described embodiment the WLAN terminal 100 that wirelessly communicates with the WWAN terminal 200 having subscriber identification information for a WWAN and connects to the WLAN 500 to perform wireless communication receives authentication information based on the subscriber identification information from the WWAN terminal 200, and performs authentication to the WLAN 500 using the received authentication information. Thus, the WLAN terminal 100 is able to connect to the WLAN 500 easily to use the Internet even without a WWAN communication function and subscriber identification information. According to the present technology, it is possible to increase Internet-use opportunities for devices not compatible with WWAN.

In addition, the WLAN terminal 100 is able to use tethering, which is a technology of causing the WWAN terminal 200 to serve as a WLAN access point, and controlling a wireless communication process using the WWAN 300 relayed by the WWAN terminal 200. For example, even when away from a service area of the WLAN 500, the WLAN terminal 100 can keep connection to the Internet by using tethering. This allows a user to use the Internet without regard for the presence of the WLAN 500. Moreover, the WLAN terminal 100 is connectable to the WLAN 500 in the service area of the WLAN 500, which can reduce communication load of the WWAN 300 and reduce power consumption of the WWAN terminal 200 due to tethering.

In addition, the WLAN terminal 100 can receive network information and transmit and receive messages for an EAP authentication process by proximity wireless communication. Thus, a user can connect the WLAN terminal 100 to the WLAN 500 by only bringing the WLAN terminal 100 close to the WWAN terminal 200. Moreover, in the case where messages for the EAP authentication process are transmitted and received by Bluetooth, after the transfer of network information using NFC, the WLAN terminal 100 and the WWAN terminal 200 need not be close to each other, which leads to further improved user convenience.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above-described embodiment, the communication scheme used by the wireless communication system 1 is described to be WWAN, Bluetooth, NFC, or WLAN, but the present technology is not limited to such examples. For example, in the above-described embodiment, a communication scheme of a public network capable of performing authentication using subscriber identification information is described to be WLAN, but any other communication scheme may be used for operation. Moreover, as the communication scheme used for communication between the WLAN terminal 100 and the WWAN terminal 200, any communication scheme, such as infrared communication or Zigbee (registered trademark), may be used as well as Bluetooth and NFC.

The series of processes carried out by each apparatus described in the present specification may be implemented by software, hardware, or a combination of software and hardware. Programs that compose such software may be stored in advance for example on a storage medium (non-transitory medium) provided inside or outside each apparatus. As one example, during execution by a computer, such programs are written into a RAM (Random Access Memory) and executed by a processor such as a CPU.

Note that it is not necessary for the processes described in this specification with reference to the flowchart and the sequence diagrams to be executed in the order shown in the flowchart and the sequence diagrams. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A wireless communication apparatus including:

a first wireless communication unit configured to wirelessly communicate with a wireless terminal having subscriber identification information for a first network;

a second wireless communication unit configured to connect to a second network to perform wireless communication; and a control unit configured to receive authentication information based on the subscriber identification information from the wireless terminal by the first wireless communication unit, and perform authentication to the second network using the authentication information by the second wireless communication unit.

(2)

The wireless communication apparatus according to (1), wherein the control unit transmits a first message for authentication to the second network, which has been received by the second wireless communication unit, to the wireless terminal by the first wireless communication unit, and transmits a second message including the authentication information, which has been received from the wireless terminal by the first wireless communication unit, to the second network by the first wireless communication unit.

(3)

The wireless communication apparatus according to (2), wherein the first message and the second message are messages for an authentication process using extensible authentication protocol (EAP).

(4)

The wireless communication apparatus according to (2) or (3), wherein the first wireless communication unit performs wireless communication using a near field communication scheme.

(5)

The wireless communication apparatus according to (4), wherein the control unit receives network information for connecting to the second network by the first wireless communication unit, and connects to the second network on the basis of the network information.

(6)

The wireless communication apparatus according to (5), wherein the first wireless communication unit receives the network information using near field communication (NFC).

(7)

The wireless communication apparatus according to any one of (4) to (6), wherein the first wireless communication unit transmits and receives messages for authentication to the second network to and from the wireless terminal using NFC.

(8)

The wireless communication apparatus according to any one of (4) to (6), wherein the first wireless communication unit transmits and receives messages for authentication to the second network to and from the wireless terminal using Bluetooth (registered trademark).

(9)

The wireless communication apparatus according to (8), wherein the control unit receives Bluetooth connection information for establishing wireless connection with the wireless terminal using Bluetooth by the first wireless communication unit, and establishes wireless communication using Bluetooth with the wireless terminal by the first wireless communication unit on the basis of the Bluetooth connection information.

(10)

The wireless communication apparatus according to any one of (4) to (9), wherein the control unit transmits network information for connecting to the second network and Bluetooth connection information for establishing wireless connection with the wireless terminal using Bluetooth to another wireless terminal by the first wireless communication unit.

(11)

The wireless communication apparatus according to any one of (1) to (10), wherein the second wireless communication unit performs wireless communication using a wireless local area network (LAN).

(12)

The wireless communication apparatus according to any one of (1) to (11), wherein the control unit controls a wireless communication process using the first network relayed by the wireless terminal.

(13)

The wireless communication apparatus according to any one of (1) to (12), wherein the first network and the second network share the subscriber identification information for authentication.

(14)

The wireless communication apparatus according to any one of (1) to (13), wherein the first network is a mobile communication network.

(15)

The wireless communication apparatus according to any one of (1) to (14), wherein the second network is a public wireless LAN.

(16)

A wireless communication apparatus including:

a storage unit configured to store subscriber identification information for a first network;

a wireless communication unit configured to wirelessly communicate with a wireless terminal that connects to a second network to perform wireless communication; and a control unit configured to generate authentication information based on the subscriber identification information stored in the storage unit, and transmit the authentication information to the wireless terminal by the wireless communication unit.

(17)

The wireless communication apparatus according to (16), wherein the control unit transmits a request for network information for the wireless terminal to connect to the second network to the first network, and transmits the received network information to the wireless terminal by the wireless communication unit.

(18)

The wireless communication apparatus according to (16) or (17), wherein the control unit generates the authentication information on the basis of a first message for authentication of the wireless terminal to the second network, the first message having been received from the wireless terminal by the wireless communication unit, and transmits a second message including the generated authentication information to the wireless terminal by the wireless communication unit.

(19)

The wireless communication apparatus according to any one of (16) to (18), wherein the control unit generates the authentication information by performing an authentication process using EAP.

(20)

The wireless communication apparatus according to any one of (16) to (19), wherein the control unit transmits Bluetooth connection information for the wireless terminal to establish wireless connection using Bluetooth with the wireless communication unit to the wireless terminal by the wireless communication unit.

REFERENCE SIGNS LIST

1 wireless communication system
100 WLAN terminal
110 wireless communication unit
112 WLAN module
114 BT module
116 NFC module
120 memory unit
130 control unit
200 WWAN terminal
210 wireless communication unit
212 WWAN module
214 WLAN module
216 BT module
218 NFC module
220 memory unit
230 subscriber identification module
240 control unit
300 WWAN
310 base station
320 gateway
330 subscriber information server
340 authentication server
350 network information providing server
400 service network
500 WLAN
510 base station

The invention claimed is:

1. A wireless communication apparatus comprising:

a first wireless communication circuit configured to wirelessly communicate with a wireless terminal having subscriber identification information for a first network;

a second wireless communication circuit configured to connect to a second network to perform wireless communication, the wireless communication including data communication only after an authentication of the second wireless communication circuit has been performed to the second network; and a control circuit configured to receive authentication information based on the subscriber identification information from the wireless terminal by the first wireless communication circuit, and perform the authentication of the second wireless communication circuit to the second network using the authentication information by the second wireless communication circuit to permit the second wireless communication circuit to start to perform the data communication over the second network.

2. The wireless communication apparatus according to claim 1, wherein the control circuit;

transmits a first message for authentication to the second network, which has been received by the second wireless communication circuit, to the wireless terminal by the first wireless communication circuit, and transmits a second message including the authentication information, which has been received from the wireless terminal by the first wireless communication circuit, to the second network by the first wireless communication circuit.

3. The wireless communication apparatus according to claim 2, wherein the first message and the second message are messages for an authentication process using extensible authentication protocol (EAP).

4. The wireless communication apparatus according to claim 2, wherein the first wireless communication circuit performs wireless communication using a near field communication scheme.

5. The wireless communication apparatus according to claim 4, wherein the control circuit receives network information for connecting to the second network by the first wireless communication circuit, and connects to the second network on the basis of the network information.

6. The wireless communication apparatus according to claim 5, wherein the first wireless communication circuit receives the network information using near field communication (NFC).

7. The wireless communication apparatus according to claim 4, wherein the first wireless communication circuit transmits and receives messages for authentication to the second network to and from the wireless terminal using NFC.

8. The wireless communication apparatus according to claim 4, wherein the first wireless communication circuit transmits and receives messages for authentication to the second network to and from the wireless terminal using Bluetooth (registered trademark).

9. The wireless communication apparatus according to claim 8, wherein the control circuit receives Bluetooth connection information for establishing wireless connection with the wireless terminal using Bluetooth by the first wireless communication circuit, and establishes wireless communication using Bluetooth with the wireless terminal by the first wireless communication circuit on the basis of the Bluetooth connection information.

10. The wireless communication apparatus according to claim 4, wherein the control circuit transmits network information for connecting to the second network and Bluetooth connection information for establishing wireless connection with the wireless terminal using Bluetooth to another wireless terminal by the first wireless communication circuit.

11. The wireless communication apparatus according to claim 1, wherein the second wireless communication circuit performs wireless communication using a wireless local area network (LAN).

12. The wireless communication apparatus according to claim 1, wherein the control circuit controls a wireless communication process using the first network relayed by the wireless terminal.

13. The wireless communication apparatus according to claim 1, wherein the first network and the second network share the subscriber identification information for authentication.

14. The wireless communication apparatus according to claim 1, wherein the first network is a mobile communication network.

15. The wireless communication apparatus according to claim 1, wherein the second network is a public wireless LAN.

* * * * *